United States Patent
Wu et al.

(10) Patent No.: US 10,742,677 B1
(45) Date of Patent: Aug. 11, 2020

(54) AUTOMATIC DETERMINATION OF USER ROLES AND ASSET TYPES BASED ON NETWORK MONITORING

(71) Applicant: ExtraHop Networks, Inc., Seattle, WA (US)

(72) Inventors: Xue Jun Wu, Seattle, WA (US); Benjamin Thomas Higgins, Shoreline, WA (US); Michael Kerber Krause Montague, Lake Forest Park, WA (US); Po-Shen Lee, Seattle, WA (US); Songqian Chen, Seattle, WA (US); Jade Alexi Tabony, Seattle, WA (US); Katherine Megan Porterfield, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

(21) Appl. No.: 16/560,886

(22) Filed: Sep. 4, 2019

(51) Int. Cl.
*H04L 29/06* (2006.01)

(52) U.S. Cl.
CPC ........ *H04L 63/1425* (2013.01); *H04L 63/105* (2013.01)

(58) Field of Classification Search
CPC .. H04L 63/1425; H04L 63/168; G06F 21/316
See application file for complete search history.

(56) References Cited

U.S. PATENT DOCUMENTS

| | | |
|---|---|---|
| 5,027,269 A | 6/1991 | Grant et al. |
| 5,430,727 A | 7/1995 | Callon |
| 5,541,995 A | 7/1996 | Normile et al. |
| 5,715,464 A | 2/1998 | Crump et al. |
| 5,787,237 A | 7/1998 | Reilly |

(Continued)

FOREIGN PATENT DOCUMENTS

| | | |
|---|---|---|
| CN | 109542772 A | 3/2019 |
| EP | 1026867 A2 | 8/2000 |

(Continued)

OTHER PUBLICATIONS

Official Communication for U.S. Appl. No. 15/671,060 dated May 8, 2019, pp. 1-18.

(Continued)

*Primary Examiner* — David J Pearson
(74) *Attorney, Agent, or Firm* — John W. Branch; Lowe Graham Jones PLLC

(57) ABSTRACT

Embodiments are directed to monitoring network traffic to determine users and assets based on the network traffic. A user role model may assign a user role and provide a role confidence score for the users based on network traffic associated with the users. An asset model may assign an asset type and provide an asset confidence score the assets based on network traffic associated with the assets. The users may be associated with assets based on the network traffic. The role confidence scores provided for the users may be modified based on the asset type assigned to assets associated with the users. The asset confidence score provided for the assets may be modified based on the user role assigned to the users associated with the assets. A report that includes information about the user roles and the asset types may be provided.

28 Claims, 10 Drawing Sheets

(56) References Cited

U.S. PATENT DOCUMENTS

| | | |
|---|---|---|
| 5,802,599 A | 9/1998 | Cabrera et al. |
| 5,835,726 A | 11/1998 | Shwed et al. |
| 5,857,188 A | 1/1999 | Douglas |
| 5,928,363 A | 7/1999 | Ruvolo |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | DiGiorgio et al. |
| 6,401,150 B1 | 6/2002 | Reilly |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,704,311 B1 | 3/2004 | Chuah et al. |
| 6,704,874 B1 | 3/2004 | Porras et al. |
| 6,765,909 B1 | 7/2004 | Sen et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,948,060 B1 | 9/2005 | Ramanathan |
| 6,968,554 B1 | 11/2005 | Macdonald et al. |
| 6,999,729 B2 | 2/2006 | Wandel |
| 7,042,888 B2 | 5/2006 | Berggreen |
| 7,089,326 B2 | 8/2006 | Boucher et al. |
| 7,133,365 B2 | 11/2006 | Klinker et al. |
| 7,143,153 B1 | 11/2006 | Black et al. |
| 7,177,930 B1 | 2/2007 | LoPresti |
| 7,181,769 B1 | 2/2007 | Keanini et al. |
| 7,193,968 B1 | 3/2007 | Kapoor et al. |
| 7,313,141 B2 | 12/2007 | Kan et al. |
| 7,424,532 B1 | 9/2008 | Subbiah |
| 7,454,499 B2 | 11/2008 | Cantrell et al. |
| 7,474,654 B2 | 1/2009 | Guru |
| 7,480,292 B2 | 1/2009 | Busi et al. |
| 7,509,680 B1 | 3/2009 | Sallam |
| 7,535,906 B2 | 5/2009 | Engbersen et al. |
| 7,543,146 B1 | 6/2009 | Karandikar et al. |
| 7,545,499 B2 | 6/2009 | Overbeck et al. |
| 7,580,356 B1 | 8/2009 | Mishra et al. |
| 7,594,273 B2 | 9/2009 | Keanini et al. |
| 7,602,731 B2 | 10/2009 | Jain |
| 7,606,706 B1 | 10/2009 | Rubin et al. |
| 7,609,630 B2 | 10/2009 | Gobeil |
| 7,619,988 B2 | 11/2009 | Shimada et al. |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,724,905 B2 | 5/2010 | Bleumer et al. |
| 7,739,497 B1 | 6/2010 | Fink et al. |
| 7,774,456 B1 | 8/2010 | Lownsbrough et al. |
| 7,809,829 B2 | 10/2010 | Kelly et al. |
| 7,810,151 B1 | 10/2010 | Guruswamy |
| 7,817,549 B1 | 10/2010 | Kasralikar et al. |
| 7,849,502 B1 | 12/2010 | Bloch et al. |
| 7,864,764 B1 | 1/2011 | Ma et al. |
| 7,916,652 B1 | 3/2011 | Lima et al. |
| 7,936,682 B2 | 5/2011 | Singh et al. |
| 7,937,755 B1 | 5/2011 | Guruswamy |
| 7,975,139 B2 | 7/2011 | Coulier |
| 7,979,555 B2 | 7/2011 | Rothstein et al. |
| 7,979,694 B2 | 7/2011 | Touitou et al. |
| 8,040,798 B2 | 10/2011 | Chandra et al. |
| 8,079,083 B1 | 12/2011 | Bennett et al. |
| 8,102,783 B1 | 1/2012 | Narayanaswamy et al. |
| 8,107,397 B1 | 1/2012 | Bagchi et al. |
| 8,125,908 B2 | 2/2012 | Rothstein et al. |
| 8,185,953 B2 | 5/2012 | Rothstein et al. |
| 8,352,725 B1 | 1/2013 | O'Toole, Jr. |
| 8,411,677 B1 | 4/2013 | Colloff |
| 8,457,127 B2 | 6/2013 | Eastham et al. |
| 8,533,254 B1 | 9/2013 | Whitson, Jr. et al. |
| 8,555,383 B1 | 10/2013 | Marshall et al. |
| 8,619,579 B1 | 12/2013 | Rothstein et al. |
| 8,627,422 B2 | 1/2014 | Hawkes et al. |
| 8,707,440 B2 | 4/2014 | Gula et al. |
| 8,782,393 B1 | 7/2014 | Rothstein et al. |
| 8,817,655 B2 | 8/2014 | Szabo et al. |
| 8,848,744 B1 | 9/2014 | Rothstein et al. |
| 8,861,397 B2 | 10/2014 | Kind et al. |
| 8,971,196 B2 | 3/2015 | Degioanni et al. |
| 9,036,493 B2 | 5/2015 | Degioanni et al. |
| 9,049,216 B2 | 6/2015 | McCanne et al. |
| 9,158,604 B1 | 10/2015 | Christodorescu et al. |
| 9,183,573 B2 | 11/2015 | Tseng |
| 9,189,318 B2 | 11/2015 | Li et al. |
| 9,191,400 B1 | 11/2015 | Ptasinski et al. |
| 9,203,865 B2 | 12/2015 | Linden et al. |
| 9,264,268 B2 | 2/2016 | Arora et al. |
| 9,338,147 B1 | 5/2016 | Rothstein et al. |
| 9,357,410 B2 | 5/2016 | Nedeltchev et al. |
| 9,380,489 B2 | 6/2016 | Kotecha et al. |
| 9,391,866 B1 | 7/2016 | Martin et al. |
| 9,400,871 B1 | 7/2016 | Hewinson |
| 9,401,925 B1 * | 7/2016 | Guo ............... G06F 21/56 |
| 9,426,036 B1 | 8/2016 | Roy |
| 9,430,646 B1 | 8/2016 | Mushtaq et al. |
| 9,461,875 B2 | 10/2016 | Groat et al. |
| 9,483,742 B1 | 11/2016 | Ahmed |
| 9,516,053 B1 | 12/2016 | Muddu |
| 9,531,736 B1 | 12/2016 | Torres et al. |
| 9,565,202 B1 | 2/2017 | Kindlund et al. |
| 9,621,523 B2 | 4/2017 | Rothstein et al. |
| 9,692,658 B2 | 6/2017 | Guo et al. |
| 9,715,820 B1 | 7/2017 | Boss et al. |
| 9,729,416 B1 | 8/2017 | Khanal et al. |
| 10,009,793 B2 | 6/2018 | Wetterwald et al. |
| 10,027,689 B1 | 7/2018 | Rathor et al. |
| 10,028,167 B2 | 7/2018 | Calin et al. |
| 10,038,611 B1 | 7/2018 | Wu et al. |
| 10,063,434 B1 | 8/2018 | Khanal |
| 10,263,883 B2 | 4/2019 | Kamble |
| 10,264,003 B1 | 4/2019 | Wu et al. |
| 10,277,618 B1 | 4/2019 | Wu et al. |
| 10,320,749 B2 | 6/2019 | Sengupta et al. |
| 10,536,475 B1 * | 1/2020 | McCorkle, Jr. ..... H04L 63/1425 |
| 10,554,665 B1 * | 2/2020 | Badawy ............ G06F 16/9024 |
| 2002/0023080 A1 | 2/2002 | Uga et al. |
| 2002/0024964 A1 | 2/2002 | Baum et al. |
| 2002/0035604 A1 | 3/2002 | Cohen et al. |
| 2002/0055998 A1 | 5/2002 | Riddle et al. |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0097724 A1 | 7/2002 | Halme et al. |
| 2002/0107953 A1 | 8/2002 | Ontiveros et al. |
| 2002/0133586 A1 | 9/2002 | Shanklin et al. |
| 2002/0133622 A1 | 9/2002 | Pinto |
| 2002/0152209 A1 | 10/2002 | Merugu et al. |
| 2002/0156880 A1 | 10/2002 | Mokuya |
| 2002/0199098 A1 | 12/2002 | Davis |
| 2003/0014628 A1 | 1/2003 | Freed et al. |
| 2003/0084279 A1 | 5/2003 | Campagna |
| 2003/0093514 A1 | 5/2003 | Valdes et al. |
| 2003/0131116 A1 | 7/2003 | Jain et al. |
| 2003/0135667 A1 | 7/2003 | Mann et al. |
| 2003/0149887 A1 | 8/2003 | Yadav |
| 2003/0152094 A1 | 8/2003 | Colavito et al. |
| 2003/0156715 A1 | 8/2003 | Reeds, III et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0233361 A1 | 12/2003 | Cady |
| 2004/0003094 A1 | 1/2004 | See |
| 2004/0047325 A1 | 3/2004 | Hameleers et al. |
| 2004/0049699 A1 | 3/2004 | Griffith et al. |
| 2004/0073512 A1 | 4/2004 | Maung |
| 2004/0088544 A1 | 5/2004 | Tariq et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |

(56) References Cited

U.S. PATENT DOCUMENTS

| | | |
|---|---|---|
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0015622 A1 | 1/2005 | Williams et al. |
| 2005/0050316 A1 | 3/2005 | Peles |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0125553 A1 | 6/2005 | Wu et al. |
| 2005/0125684 A1 | 6/2005 | Schmidt |
| 2005/0182833 A1 | 8/2005 | Duffie, III et al. |
| 2005/0193245 A1 | 9/2005 | Hayden et al. |
| 2005/0201363 A1 | 9/2005 | Gilchrist et al. |
| 2005/0210242 A1 | 9/2005 | Troxel et al. |
| 2005/0234920 A1 | 10/2005 | Rhodes |
| 2005/0251009 A1 | 11/2005 | Morita |
| 2005/0262237 A1 | 11/2005 | Fulton et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0075358 A1 | 4/2006 | Ahokas |
| 2006/0085526 A1 | 4/2006 | Gulland |
| 2006/0101068 A1 | 5/2006 | Stuhee et al. |
| 2006/0106743 A1 | 5/2006 | Horvitz |
| 2006/0123477 A1 | 6/2006 | Raghavan et al. |
| 2006/0171333 A1 | 8/2006 | Shimada et al. |
| 2006/0174343 A1 | 8/2006 | Duthie et al. |
| 2006/0184535 A1 | 8/2006 | Kaluskar et al. |
| 2006/0188494 A1 | 8/2006 | Bach et al. |
| 2006/0191008 A1 | 8/2006 | Fernando et al. |
| 2006/0191009 A1 | 8/2006 | Ito et al. |
| 2006/0230452 A1 | 10/2006 | Field |
| 2006/0230456 A1 | 10/2006 | Nagabhushan et al. |
| 2006/0233349 A1 | 10/2006 | Cooper |
| 2007/0039051 A1 | 2/2007 | Duthie et al. |
| 2007/0043861 A1 | 2/2007 | Baron et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0110053 A1 | 5/2007 | Soni et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0169190 A1 | 7/2007 | Kolton et al. |
| 2007/0188494 A1 | 8/2007 | Agutter et al. |
| 2007/0192863 A1 | 8/2007 | Kapoor et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikanen et al. |
| 2008/0062995 A1 | 3/2008 | Kaas et al. |
| 2008/0069002 A1 | 3/2008 | Savoor et al. |
| 2008/0103610 A1 | 5/2008 | Ebrom et al. |
| 2008/0130659 A1 | 6/2008 | Polland |
| 2008/0141275 A1 | 6/2008 | Borgendale et al. |
| 2008/0147818 A1 | 6/2008 | Sabo |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0232359 A1 | 9/2008 | Kim et al. |
| 2008/0279111 A1 | 11/2008 | Atkins et al. |
| 2008/0282080 A1 | 11/2008 | Hyndman et al. |
| 2008/0294384 A1 | 11/2008 | Fok et al. |
| 2008/0307219 A1 | 12/2008 | Karandikar |
| 2008/0320297 A1 | 12/2008 | Sabo et al. |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0089326 A1 | 4/2009 | Balasubramanian |
| 2009/0109973 A1 | 4/2009 | Ilnicki |
| 2009/0168657 A1 | 7/2009 | Puri et al. |
| 2009/0220080 A1 | 9/2009 | Herne et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0268605 A1 | 10/2009 | Campbell et al. |
| 2009/0271469 A1 | 10/2009 | Benco et al. |
| 2009/0292954 A1 | 11/2009 | Jiang et al. |
| 2009/0296593 A1 | 12/2009 | Prescott |
| 2009/0316602 A1 | 12/2009 | Nandy et al. |
| 2009/0327695 A1 | 12/2009 | Molsberry et al. |
| 2010/0027432 A1 | 2/2010 | Gopalan |
| 2010/0091770 A1 | 4/2010 | Ishikawa |
| 2010/0095367 A1 | 4/2010 | Narayanaswamy |
| 2010/0131755 A1 | 5/2010 | Zhu et al. |
| 2010/0135498 A1 | 6/2010 | Long et al. |
| 2010/0167713 A1 | 7/2010 | Hoffman |
| 2010/0191856 A1 | 7/2010 | Gupta et al. |
| 2010/0201573 A1 | 8/2010 | Lamming |
| 2010/0226301 A1 | 9/2010 | Lohmar et al. |
| 2010/0250928 A1 | 9/2010 | Goto |
| 2010/0268937 A1 | 10/2010 | Blom et al. |
| 2010/0278056 A1 | 11/2010 | Meloche et al. |
| 2010/0281539 A1 | 11/2010 | Burns et al. |
| 2010/0299158 A1 | 11/2010 | Siegel |
| 2010/0316216 A1 | 12/2010 | Fukushima et al. |
| 2010/0322248 A1 | 12/2010 | Ivanov |
| 2010/0332618 A1 | 12/2010 | Norton |
| 2011/0019574 A1 | 1/2011 | Malomsoky et al. |
| 2011/0055138 A1 | 3/2011 | Khanduja et al. |
| 2011/0126259 A1 | 5/2011 | Krishnamurthi et al. |
| 2011/0173441 A1 | 7/2011 | Bagepalli et al. |
| 2011/0173490 A1 | 7/2011 | Narayanaswamy et al. |
| 2011/0197276 A1 | 8/2011 | Dorrendorf et al. |
| 2011/0280149 A1 | 11/2011 | Okada et al. |
| 2011/0296002 A1 | 12/2011 | Caram |
| 2011/0320394 A1 | 12/2011 | McKeown et al. |
| 2011/0321160 A1 | 12/2011 | Mohandas et al. |
| 2012/0016977 A1 | 1/2012 | Robertson et al. |
| 2012/0030731 A1 | 2/2012 | Bhargava et al. |
| 2012/0130745 A1 | 5/2012 | Jones |
| 2012/0131330 A1 | 5/2012 | Tonsing et al. |
| 2012/0166962 A1 | 6/2012 | Lunsford |
| 2012/0176917 A1 | 7/2012 | Matityahu et al. |
| 2012/0210385 A1 | 8/2012 | Cirstea et al. |
| 2012/0215328 A1 | 8/2012 | Schmelzer |
| 2012/0216282 A1 | 8/2012 | Pappu et al. |
| 2012/0233694 A1 | 9/2012 | Baliga et al. |
| 2012/0243533 A1 | 9/2012 | Leong |
| 2012/0278477 A1 | 11/2012 | Terrell et al. |
| 2012/0290711 A1 | 11/2012 | Upham et al. |
| 2012/0294305 A1 | 11/2012 | Rose et al. |
| 2013/0007296 A1 | 1/2013 | Mukherjee et al. |
| 2013/0010608 A1 | 1/2013 | Ramachandran et al. |
| 2013/0042323 A1 | 2/2013 | Narayanaswamy et al. |
| 2013/0061036 A1 | 3/2013 | Oliver |
| 2013/0064084 A1 | 3/2013 | Babbar et al. |
| 2013/0067034 A1 | 3/2013 | Degioanni et al. |
| 2013/0103734 A1 | 4/2013 | Boldyrev et al. |
| 2013/0133032 A1 | 5/2013 | Li et al. |
| 2013/0166730 A1 | 6/2013 | Wilkinson |
| 2013/0176842 A1 | 7/2013 | Bauchot et al. |
| 2013/0188645 A1 | 7/2013 | Mack-Crane |
| 2013/0198512 A1 | 8/2013 | Rubin et al. |
| 2013/0212297 A1 | 8/2013 | Varga |
| 2013/0227259 A1 | 8/2013 | Kim |
| 2013/0232104 A1 | 9/2013 | Goyal et al. |
| 2013/0262655 A1 | 10/2013 | Deschenes et al. |
| 2013/0305357 A1 | 11/2013 | Ayyagari et al. |
| 2013/0339514 A1 | 12/2013 | Crank et al. |
| 2013/0347018 A1 | 12/2013 | Limp et al. |
| 2014/0040451 A1 | 2/2014 | Agrawal et al. |
| 2014/0068035 A1 | 3/2014 | Croy et al. |
| 2014/0075536 A1 | 3/2014 | Davis et al. |

(56) References Cited

U.S. PATENT DOCUMENTS

| | | |
|---|---|---|
| 2014/0077956 A1 | 3/2014 | Sampath et al. |
| 2014/0109168 A1* | 4/2014 | Ashley ................ G06F 21/552 726/1 |
| 2014/0149456 A1 | 5/2014 | Carr et al. |
| 2014/0164584 A1 | 6/2014 | Joe et al. |
| 2014/0165207 A1 | 6/2014 | Engel et al. |
| 2014/0189093 A1 | 7/2014 | du Toit et al. |
| 2014/0195797 A1 | 7/2014 | du Toit |
| 2014/0222998 A1 | 8/2014 | Vasseur et al. |
| 2014/0223325 A1 | 8/2014 | Melendez et al. |
| 2014/0242972 A1 | 8/2014 | Slotznick |
| 2014/0258511 A1 | 9/2014 | Sima et al. |
| 2014/0269777 A1 | 9/2014 | Rothstein et al. |
| 2014/0304211 A1 | 10/2014 | Horvitz |
| 2014/0310392 A1 | 10/2014 | Ho |
| 2014/0317288 A1 | 10/2014 | Krueger et al. |
| 2014/0344633 A1 | 11/2014 | Li et al. |
| 2014/0351415 A1 | 11/2014 | Harrigan et al. |
| 2015/0006896 A1 | 1/2015 | Franck |
| 2015/0007314 A1 | 1/2015 | Vaughan |
| 2015/0023168 A1 | 1/2015 | Kotecha et al. |
| 2015/0058987 A1 | 2/2015 | Thure et al. |
| 2015/0063158 A1 | 3/2015 | Nedeltchev et al. |
| 2015/0074258 A1 | 3/2015 | Ferreira et al. |
| 2015/0074462 A1 | 3/2015 | Jacoby |
| 2015/0089034 A1 | 3/2015 | Stickle et al. |
| 2015/0096022 A1 | 4/2015 | Vincent |
| 2015/0100780 A1 | 4/2015 | Rubin et al. |
| 2015/0134554 A1 | 5/2015 | Clais et al. |
| 2015/0134776 A1 | 5/2015 | Kruglick |
| 2015/0149828 A1 | 5/2015 | Mukerji et al. |
| 2015/0180759 A1 | 6/2015 | Fallon |
| 2015/0180890 A1 | 6/2015 | Ronen et al. |
| 2015/0188702 A1 | 7/2015 | Men et al. |
| 2015/0199613 A1 | 7/2015 | Ruiz et al. |
| 2015/0227859 A1 | 8/2015 | Ames, II |
| 2015/0229661 A1 | 8/2015 | Balabine et al. |
| 2015/0242627 A1 | 8/2015 | Lee et al. |
| 2015/0249512 A1 | 9/2015 | Adimatyam et al. |
| 2015/0269358 A1 | 9/2015 | Hesketh et al. |
| 2015/0277802 A1 | 10/2015 | Oikarinen et al. |
| 2015/0331771 A1 | 11/2015 | Conway |
| 2015/0341379 A1 | 11/2015 | Lefebvre et al. |
| 2015/0350167 A1 | 12/2015 | Djakovic |
| 2016/0006766 A1 | 1/2016 | Joo |
| 2016/0026922 A1 | 1/2016 | Vasseur |
| 2016/0028755 A1 | 1/2016 | Vasseur et al. |
| 2016/0036647 A1 | 2/2016 | Gonzalez et al. |
| 2016/0043919 A1 | 2/2016 | Connelly et al. |
| 2016/0055335 A1 | 2/2016 | Herwono et al. |
| 2016/0056959 A1 | 2/2016 | Blom et al. |
| 2016/0093205 A1 | 3/2016 | Boyer |
| 2016/0119215 A1 | 4/2016 | Deschenes et al. |
| 2016/0127401 A1 | 5/2016 | Chauhan |
| 2016/0134659 A1 | 5/2016 | Reddy et al. |
| 2016/0173556 A1 | 6/2016 | Park et al. |
| 2016/0182274 A1 | 6/2016 | Kiesekamp et al. |
| 2016/0197949 A1 | 7/2016 | Nyhuis et al. |
| 2016/0219066 A1 | 7/2016 | Vasseur et al. |
| 2016/0262044 A1 | 9/2016 | Calin et al. |
| 2016/0285752 A1 | 9/2016 | Joshi |
| 2016/0294870 A1 | 10/2016 | Banjerjee et al. |
| 2016/0301709 A1 | 10/2016 | Hassanzadeh et al. |
| 2016/0308725 A1* | 10/2016 | Tang ................ H04L 63/1425 |
| 2016/0357964 A1 | 12/2016 | Mulchandani |
| 2016/0357967 A1 | 12/2016 | Mulchandani |
| 2016/0359872 A1 | 12/2016 | Yadav et al. |
| 2016/0380885 A1 | 12/2016 | Jani et al. |
| 2017/0076206 A1 | 3/2017 | Lastras-Montano et al. |
| 2017/0085590 A1 | 3/2017 | Hsu et al. |
| 2017/0093796 A1 | 3/2017 | Wang et al. |
| 2017/0093891 A1 | 3/2017 | Mitchell |
| 2017/0099196 A1 | 4/2017 | Barsheshet et al. |
| 2017/0111272 A1 | 4/2017 | Liu et al. |
| 2017/0118092 A1 | 4/2017 | Dixon et al. |
| 2017/0123886 A1 | 5/2017 | Vaideeswaran |
| 2017/0126709 A1 | 5/2017 | Baradaran et al. |
| 2017/0134937 A1 | 5/2017 | Miller et al. |
| 2017/0230270 A1 | 8/2017 | Padinhakara et al. |
| 2017/0270105 A1 | 9/2017 | Ninan et al. |
| 2017/0279838 A1 | 9/2017 | Dasgupta et al. |
| 2017/0288974 A1 | 10/2017 | Yoshihira et al. |
| 2017/0289104 A1 | 10/2017 | Shankar et al. |
| 2017/0289168 A1* | 10/2017 | Bar ................ G06F 21/316 |
| 2017/0289847 A1 | 10/2017 | Wetterwald et al. |
| 2017/0310703 A1 | 10/2017 | Ackerman et al. |
| 2017/0353437 A1 | 12/2017 | Ayyadevara et al. |
| 2017/0353477 A1 | 12/2017 | Faigon |
| 2017/0366526 A1 | 12/2017 | Wood et al. |
| 2018/0084011 A1 | 3/2018 | Joseph et al. |
| 2018/0109507 A1 | 4/2018 | Caldera et al. |
| 2018/0109557 A1 | 4/2018 | Yoo et al. |
| 2018/0131675 A1 | 5/2018 | Sengupta et al. |
| 2018/0131711 A1 | 5/2018 | Chen et al. |
| 2018/0139227 A1* | 5/2018 | Martin ................ H04L 63/1433 |
| 2018/0167310 A1 | 6/2018 | Kamble |
| 2018/0191755 A1 | 7/2018 | Monaco et al. |
| 2018/0198812 A1 | 7/2018 | Christodorescu et al. |
| 2018/0219879 A1 | 8/2018 | Pierce |
| 2018/0260715 A1 | 9/2018 | Yan et al. |
| 2019/0007283 A1 | 1/2019 | Kieviet et al. |
| 2019/0012441 A1* | 1/2019 | Tuli ................ G06F 21/316 |
| 2019/0028357 A1 | 1/2019 | Kokkula et al. |
| 2019/0102469 A1 | 4/2019 | Makovsky et al. |
| 2019/0121979 A1 | 4/2019 | Chari et al. |
| 2019/0171725 A1 | 6/2019 | Shen et al. |
| 2019/0196912 A1 | 6/2019 | Didehban et al. |
| 2019/0245763 A1 | 8/2019 | Wu et al. |
| 2019/0266999 A1 | 8/2019 | Chandrasekaran et al. |
| 2019/0303198 A1 | 10/2019 | Kim et al. |

FOREIGN PATENT DOCUMENTS

| | | |
|---|---|---|
| EP | 3089424 A1 | 11/2016 |
| EP | 3113443 A1 | 4/2017 |
| KR | 1020140093060 A | 7/2014 |
| WO | 2016144932 A1 | 9/2016 |

OTHER PUBLICATIONS

Official Communication for U.S. Appl. No. 16/113,422 dated Jun. 5, 2019, pp. 1-35.

Official Communication for U.S. Appl. No. 15/891,273 dated May 28, 2019, pp. 1-7.

Official Communication for U.S. Appl. No. 13/831,673 dated Sep. 30, 2013, pp. 1-17.

Official Communication for U.S. Appl. No. 13/831,673 dated Mar. 6, 2014, pp. 1-20.

Official Communication for U.S. Appl. No. 13/831,673 dated May 22, 2014, pp. 1-11.

Official Communication for U.S. Appl. No. 13/831,626 dated Sep. 3, 2013, pp. 1-32.

Official Communication for U.S. Appl. No. 13/831,959 dated Aug. 22, 2013, pp. 1-16.

Handel et al. (1996) Hiding data in the OSI network model. In: Anderson R. (eds) Information Hiding. IH 1996. Lecture Notes in Computer Science, vol. 1174. Springer, Berlin, Heidelberg.

Official Communication for U.S. Appl. No. 14/500,893 dated Nov. 20, 2014, pp. 1-23.

Official Communication for U.S. Appl. No. 14/107,580 dated Mar. 6, 2014, pp. 1-18.

Official Communication for U.S. Appl. No. 13/831,908 dated Aug. 9, 2013, pp. 1-42.

Official Communication for U.S. Appl. No. 13/831,908 dated Jan. 13, 2014, pp. 1-34.

Official Communication for U.S. Appl. No. 13/831,908 dated Apr. 9, 2014, pp. 1-4.

Official Communication for U.S. Appl. No. 13/831,908 dated Jun. 25, 2014, pp. 1-22.

(56) References Cited

OTHER PUBLICATIONS

Official Communication for U.S. Appl. No. 14/518,996 dated Nov. 20, 2014, pp. 1-51.
Official Communication for U.S. Appl. No. 14/107,631 dated Feb. 20, 2014, pp. 1-45.
Official Communication for U.S. Appl. No. 14/107,631 dated Sep. 26, 2014, pp. 1-28.
Official Communication for U.S. Appl. No. 14/107,631 dated Dec. 30, 2014, pp. 1-301.
Handley et al., "Network Intrusion Detection: Evasion, Traffic Normalization, and End-to-End Protocol Semantics," 2011, International Computer Science Institute, pp. 1-17.
Information Sciences Institute, "Internet Protocol Darpa Internet Program Protocol Specification," Sep. 1981, pp. 1-36.
Fuertes, "Evaluation of OSPF Extensions in MANET Routing," Paris, 2007, pp. 1-192.
Parsons, "Moving Across the Internet: Code-Bodies, Code-Corpses, and Network Architecture," May 9, 2010, pp. 1-20.
Zander et al., "Covert Channels and Countermeasures in Computer Network Protocols," Dec. 2007, pp. 1-7.
Official Communication for U.S. Appl. No. 14/107,580 dated Mar. 17, 2015, pp. 1-25.
Lin, Mark, "An Overview of Session Hijacking at the Network and Application Levels," Jan. 18, 2005, pp. 1-16.
U.S. Appl. No. 11/683,643, filed Mar. 8, 2007.
U.S. Appl. No. 11/679,356, filed Feb. 27, 2007.
Official Communication for U.S. Appl. No. 12/326,672 dated Jun. 9, 2010, pp. 1-14.
Official Communication for U.S. Appl. No. 12/326,672 dated Dec. 23, 2010, pp. 1-19.
Official Communication for U.S. Appl. No. 12/326,672 dated Jun. 22, 2011, pp. 1-31.
Official Communication for U.S. Appl. No. 12/326,672 dated Oct. 24, 2011, pp. 1-46.
Official Communication for U.S. Appl. No. 11/683,643 dated Apr. 28, 2010, pp. 1-44.
Official Communication for U.S. Appl. No. 11/683,643 dated Oct. 14, 2010, pp. 1-45.
Official Communication for U.S. Appl. No. 11/683,643 dated Aug. 25, 2011, pp. 1-54.
Official Communication for U.S. Appl. No. 11/683,643 dated Jan. 23, 2012, pp. 1-43.
Official Communication for U.S. Appl. No. 15/014,932 dated Jun. 10, 2016, pp. 1-46.
Official Communication for U.S. Appl. No. 15/207,213 dated Oct. 25, 2016, pp. 1-56.
Official Communication for U.S. Appl. No. 15/014,932 dated Dec. 14, 2016, pp. 1-513.
Digital Imaging and Communications in Medicine (DICOM), Part 6: Data Dictionary, PS 3.6-2011. 2011, http://dicom.nema.org/Dicom/2011 /11_06pu.pdf, pp. 1-255.
Health Level Seven, Version 2.6, Appendix A. Nov. 2007, https://www.hl7.org/special/committees/vocab/V26_Appendix_A.pdf, p. 1-216.
Official Communication for U.S. Appl. No. 15/207,213 dated Jun. 1, 2017, pp. 1-72.
Official Communication for U.S. Appl. No. 15/207,213 dated May 8, 2017, pp. 1-7.
Official Communication for U.S. Appl. No. 15/207,213 dated Feb. 23, 2017, pp. 1-24.
Official Communication for U.S. Appl. No. 15/014,932 dated Mar. 3, 2017, pp. 1-17.
Official Communication for U.S. Appl. No. 14/107,580 dated Sep. 15, 2014, pp. 1-22.
Official Communication for U.S. Appl. No. 15/014,932 dated Aug. 1, 2017, pp. 1-31.
Official Communication for U.S. Appl. No. 15/690,135 dated Jan. 18, 2018, pp. 1-23.
Official Communication for U.S. Appl. No. 15/891,311 dated Apr. 23, 2018, pp. 1-73.
Official Communication for U.S. Appl. No. 15/892,327 dated Apr. 23, 2018, pp. 1-54.
Official Communication for U.S. Appl. No. 15/671,060 dated May 8, 2019.
Official Communication for U.S. Appl. No. 16/113,422 dated Jun. 5, 2019.
Official Communication for U.S. Appl. No. 15/891,273 dated May 28, 2019.
Official Communication for U.S. Appl. No. 13/831,673 dated Sep. 30, 2013.
Official Communication for U.S. Appl. No. 13/831,673 dated Mar. 6, 2014.
Official Communication for U.S. Appl. No. 13/831,673 dated May 22, 2014.
Official Communication for U.S. Appl. No. 13/831,626 dated Sep. 3, 2013.
Official Communication for U.S. Appl. No. 13/831,959 dated Aug. 22, 2013.
Official Communication for U.S. Appl. No. 14/500,893 dated Nov. 20, 2014.
Official Communication for U.S. Appl. No. 14/107,580 dated Mar. 6, 2014.
Official Communication for U.S. Appl. No. 13/831,908 dated Aug. 9, 2013.
Official Communication for U.S. Appl. No. 13/831,908 dated Jan. 13, 2014.
Official Communication for U.S. Appl. No. 13/831,908 dated Apr. 9, 2014.
Official Communication for U.S. Appl. No. 13/831,908 dated Jun. 25, 2014.
Official Communication for U.S. Appl. No. 14/518,996 dated Nov. 20, 2014.
Official Communication for U.S. Appl. No. 14/107,631 dated Feb. 20, 2014.
Official Communication for U.S. Appl. No. 14/107,631 dated Sep. 26, 2014.
Official Communication for U.S. Appl. No. 14/107,631 dated Dec. 30, 2014.
Official Communication for U.S. Appl. No. 14/107,580 dated Mar. 17, 2015.
Official Communication for U.S. Appl. No. 12/326,672 dated Jun. 9, 2010.
Official Communication for U.S. Appl. No. 12/326,672 dated Dec. 23, 2010.
Official Communication for U.S. Appl. No. 12/326,672 dated Jun. 22, 2011.
Official Communication for U.S. Appl. No. 12/326,672 dated Oct. 24, 2011.
Official Communication for U.S. Appl. No. 11/683,643 dated Apr. 28, 2010.
Official Communication for U.S. Appl. No. 11/683,643 dated Oct. 14, 2010.
Official Communication for U.S. Appl. No. 11/683,643 dated Aug. 25, 2011.
Official Communication for U.S. Appl. No. 11/683,643 dated Jan. 23, 2012.
Official Communication for U.S. Appl. No. 15/014,932 dated Jun. 10, 2016.
Official Communication for U.S. Appl. No. 15/207,213 dated Oct. 25, 2016.
Official Communication for U.S. Appl. No. 15/014,932 dated Dec. 14, 2016.
Official Communication for U.S. Appl. No. 15/207,213 dated Jun. 1, 2017.
Official Communication for U.S. Appl. No. 15/207,213 dated May 8, 2017.
Official Communication for U.S. Appl. No. 15/207,213 dated Feb. 23, 2017.
Official Communication for U.S. Appl. No. 15/014,932 dated Mar. 3, 2017.
Official Communication for U.S. Appl. No. 15/014,932 dated Aug. 1, 2017.

(56) References Cited

OTHER PUBLICATIONS

Official Communication for U.S. Appl. No. 15/690,135 dated Jan. 18, 2018.
Official Communication for U.S. Appl. No. 15/891,311 dated Apr. 23, 2018.
Official Communication for U.S. Appl. No. 15/892,327 dated Apr. 23, 2018.
Office Communication for U.S. Appl. No. 15/014,932 dated May 15, 2018.
Office Communication for U.S. Appl. No. 15/891,273 dated Jun. 19, 2018.
Office Communication for U.S. Appl. No. 15/014,932 dated Jul. 16, 2018.
Office Communication for U.S. Appl. No. 15/690,135 dated May 22, 2018.
Office Communication for U.S. Appl. No. 15/984,197 dated Aug. 31, 2018.
Official Communication for U.S. Appl. No. 16/048,939 dated Sep. 19, 2018.
Official Communication for U.S. Appl. No. 15/891,311 dated Sep. 24, 2018.
Official Communication for U.S. Appl. No. 16/113,442 dated Nov. 6, 2018.
Official Communication for U.S. Appl. No. 15/014,932 dated Nov. 23, 2018.
Official Communication for U.S. Appl. No. 16/100,116 dated Nov. 15, 2018.
Official Communication for U.S. Appl. No. 15/891,273 dated Jan. 15, 2019.
Official Communication for U.S. Appl. No. 15/891,311 dated Jan. 29, 2019.
Official Communication for U.S. Appl. No. 16/174,051 dated Jan. 29, 2019.
Official Communication for U.S. Appl. No. 16/107,509 dated Oct. 26, 2018.
Official Communication for U.S. Appl. No. 16/107,509 dated Apr. 1, 2019.
Official Communication for U.S. Appl. No. 16/048,939 dated Jun. 20, 2019.
Official Communication for U.S. Appl. No. 16/100,116 dated May 30, 2019.
Official Communication for U.S. Appl. No. 16/107,509 dated Jun. 14, 2019.
Official Communication for U.S. Appl. No. 16/384,574 dated May 31, 2019.
Official Communication for U.S. Appl. No. 16/107,509 dated Aug. 21, 2019.
Office Communication for U.S. Appl. No. 15/014,932 dated May 15, 2018, pp. 1-32.
Office Communication for U.S. Appl. No. 15/891,273 dated Jun. 19, 2018, pp. 1-35.
Office Communication for U.S. Appl. No. 15/014,932 dated Jul. 16, 2018, pp. 1-17.
Office Communication for U.S. Appl. No. 15/690,135 dated May 22, 2018, pp. 1-16.
Office Communication for U.S. Appl. No. 15/984,197 dated Aug. 31, 2018, pp. 1-72.
Official Communication for U.S. Appl. No. 16/048,939 dated Sep. 19, 2018, pp. 1-40.
Official Communication for U.S. Appl. No. 15/891,311 dated Sep. 24, 2018, pp. 1-31.
Official Communication for U.S. Appl. No. 16/113,442 dated Nov. 6, 2018, pp. 1-56.
Official Communication for U.S. Appl. No. 15/014,932 dated Nov. 23, 2018, pp. 1-50.
Official Communication for U.S. Appl. No. 16/100,116 dated Nov. 15, 2018, pp. 1-54.
Official Communication for U.S. Appl. No. 15/891,273 dated Jan. 15, 2019, pp. 1-47.
Official Communication for U.S. Appl. No. 15/891,311 dated Jan. 29, 2019, pp. 1-30.
Official Communication for U.S. Appl. No. 16/174,051 dated Jan. 29, 2019, pp. 1-96.
Official Communication for U.S. Appl. No. 16/107,509 dated Oct. 26, 2018, pp. 1-44.
Official Communication for U.S. Appl. No. 16/107,509 dated Apr. 1, 2019, pp. 1-72.
Official Communication for U.S. Appl. No. 16/048,939 dated Jun. 20, 2019, pp. 1-14.
Official Communication for U.S. Appl. No. 16/100,116 dated May 30, 2019, pp. 1-23.
Official Communication for U.S. Appl. No. 16/107,509 dated Jun. 14, 2019, pp. 1-6.
Official Communication for U.S. Appl. No. 16/384,574 dated May 31, 2019, pp. 1-44.
Official Communication for U.S. Appl. No. 16/107,509 dated Aug. 21, 2019, pp. 1-54.
Office Communication for U.S. Appl. No. 16/384,574 dated Oct. 8, 2019, pp. 1-60.
Office Communication for U.S. Appl. No. 16/543,243 dated Sep. 27, 2019, pp. 1-45.
Office Communication for U.S. Appl. No. 16/048,939 dated Dec. 5, 2019, pp. 1-15.
Office Communication for U.S. Appl. No. 16/565,109 dated Nov. 27, 2019, pp. 1-31.
Office Communication for U.S. Appl. No. 16/525,290 dated Oct. 31, 2019, pp. 1-17.
Office Communication for U.S. Appl. No. 16/532,275 dated Oct. 24, 2019, pp. 1-42.
Official Communication for U.S. Appl. No. 15/675,216 dated Jan. 29, 2019, pp. 1-18.
Official Communication for U.S. Appl. No. 16/384,574 dated Jan. 13, 2020, pp. 1-23.
Official Communication for U.S. Appl. No. 16/107,509 dated Jan. 23, 2020, pp. 1-39.
Official Communication for U.S. Appl. No. 15/585,887 dated Jan. 22, 2020, pp. 1-34.
Official Communication for U.S. Appl. No. 16/384,697 dated Oct. 17, 2019, pp. 1-33.
Official Communication for U.S. Appl. No. 16/459,472 dated Feb. 3, 2020, pp. 1-18.
Official Communication for U.S. Appl. No. 16/679,055 dated Feb. 14, 2020, pp. 1-32.
Official Communication for U.S. Appl. No. 16/048,939 dated Feb. 18, 2020, pp. 1-6.
Official Communication for U.S. Appl. No. 16/424,387 dated Feb. 24, 2020, pp. 1-15.
Official Communication for U.S. Appl. No. 14/500,893 dated Feb. 18, 2015, pp. 1-13.
Official Communication for U.S. Appl. No. 14/518,996 dated Apr. 20, 2015, pp. 1-53.
Official Communication for U.S. Appl. No. 14/500,893 dated Jun. 15, 2015, pp. 1-14.
Official Communication for U.S. Appl. No. 14/518,996 dated Jul. 21, 2015, pp. 1-28.
Official Communication for U.S. Appl. No. 14/695,690 dated Sep. 9, 2015, pp. 1-72.
Official Communication for U.S. Appl. No. 14/695,690 dated Feb. 24, 2016, pp. 1-32.
Official Communication for U.S. Appl. No. 15/150,354 dated Jul. 5, 2016, pp. 1-28.
Mozilla Developer Network, "NSS Key Log Format," https://developer.mozilla.org/en-US/docs/Mozilla/Projects/NSS/Key_Log_Format, Jan. 8, 2010, p. 1.
European Search Report for EP Application No. 16166907 dated Sep. 14, 2016, pp. 1-7.
Official Communication for U.S. Appl. No. 15/150,354 dated Feb. 8, 2017, pp. 1-18.
Official Communication for U.S. Appl. No. 15/466,248 dated Jun. 5, 2017, pp. 1-90.
Official Communication for U.S. Appl. No. 15/466,248 dated Oct. 3, 2017, pp. 1-91.

(56) References Cited

OTHER PUBLICATIONS

Official Communication for U.S. Appl. No. 15/457,886 dated Jan. 5, 2018, pp. 1-20.
Official Communication for U.S. Appl. No. 15/466,248 dated Jan. 11, 2018, pp. 1-4.
European Exam Report for EP Application No. 16166907 dated Mar. 9, 2018, pp. 1-4.
Shaver, "Decrypting TLS Browser Traffic with Wireshark the easy way", https://jimshaver.net/2015/02/11/decrypting-tls-browser-traffic-with-wireshark-the-easy-way/, Feb. 11, 2015, pp. 1-30.
Official Communication for U.S. Appl. No. 15/466,248 dated Mar. 8, 2018, pp. 1-108.
Official Communication for U.S. Appl. No. 15/457,886 dated Jul. 18, 2018, pp. 1-23.
Official Communication for U.S. Appl. No. 15/466,248 dated Jul. 11, 2018, pp. 1-299.
International Search Report and Written Opinion for PCT/US2017/068585 dated Jul. 4, 2018, pp. 1-11.
European Search Report for EP Application No. 17210995.1 dated Jul. 6, 2018, pp. 1-11.
Official Communication for U.S. Appl. No. 15/466,248 dated Oct. 18, 2018, pp. 1-303.
Official Communication for U.S. Appl. No. 15/457,886 dated Mar. 20, 2019, pp. 1-22.
Official Communication for U.S. Appl. No. 15/466,248 dated May 16, 2019, pp. 1-304.
Official Communication for U.S. Appl. No. 15/466,248 dated Sep. 10, 2019, pp. 1-39.
Official Communication for U.S. Appl. No. 15/971,843 dated Oct. 22, 2019, pp. 1-31.
Official Communication for U.S. Appl. No. 14/750,905 dated Sep. 22, 2015, pp. 1-10.
Official Communication for U.S. Appl. No. 14/750,905 dated Jan. 19, 2016, pp. 1-16.
Official Communication for U.S. Appl. No. 15/082,925 dated Sep. 13, 2016, pp. 1-8.
Official Communication for U.S. Appl. No. 15/289,760 dated Dec. 12, 2016, pp. 1-23.
Official Communication for U.S. Appl. No. 15/219,016 dated Nov. 22, 2016, pp. 1-13.
Official Communication for U.S. Appl. No. 15/356,381 dated Jan. 6, 2017, pp. 1-66.
Official Communication for U.S. Appl. No. 15/082,925 dated Feb. 1, 2017, pp. 1-16.
Official Communication for U.S. Appl. No. 15/219,016 dated Mar. 16, 2017, pp. 1-13.
Official Communication for U.S. Appl. No. 15/443,868 dated Apr. 27, 2017, pp. 1-14.
Official Communication for U.S. Appl. No. 15/585,887 dated Jun. 27, 2017, pp. 1-54.
Official Communication for U.S. Appl. No. 15/356,381 dated Jul. 3, 2017, pp. 1-49.
Official Communication for U.S. Appl. No. 15/675,216 dated Jun. 7, 2018, pp. 1-5.
Official Communication for U.S. Appl. No. 15/443,868 dated Aug. 11, 2017, pp. 1-21.
Official Communication for U.S. Appl. No. 15/675,216 dated Nov. 20, 2017, pp. 1-10.
Official Communication for U.S. Appl. No. 15/585,887 dated Nov. 28, 2017, pp. 1-29.
International Search Report and Written Opinion for PCT/US2018/030145 dated Aug. 10, 2018, pp. 1-12.
Svoboda et al., "Network Traffic Analysis with Deep Packet Inspection Method", pp. 1-148.
International Search Report and Written Opinion for PCT/US2017/068586 dated Aug. 9, 2018, pp. 1-14.
European Search Report for EP Application No. 17210996 dated Jun. 13, 2018, pp. 1-7.
Official Communication for U.S. Appl. No. 15/855,769 dated Feb. 5, 2019, pp. 1-21.
Official Communication for U.S. Appl. No. 15/855,769 dated May 1, 2019, pp. 1-20.
Official Communication for U.S. Appl. No. 16/459,472 dated Aug. 14, 2019, pp. 1-24.
Official Communication for U.S. Appl. No. 15/585,887 dated Mar. 20, 2019, pp. 1-35.
Official Communication for U.S. Appl. No. 15/675,216 dated Aug. 28, 2018, pp. 1-21.

\* cited by examiner

US 10,742,677 B1

AUTOMATIC DETERMINATION OF USER ROLES AND ASSET TYPES BASED ON NETWORK MONITORING

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from seven to four, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

In some cases, organizations may enable various users that have different various roles to access assets in their networks. And, while users or assets may be assigned roles or other classifications, it may be challenging to confirm such assignments. In some cases, it may also be difficult to discover users or assets that are associated with activity outside of the assigned roles or categories. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
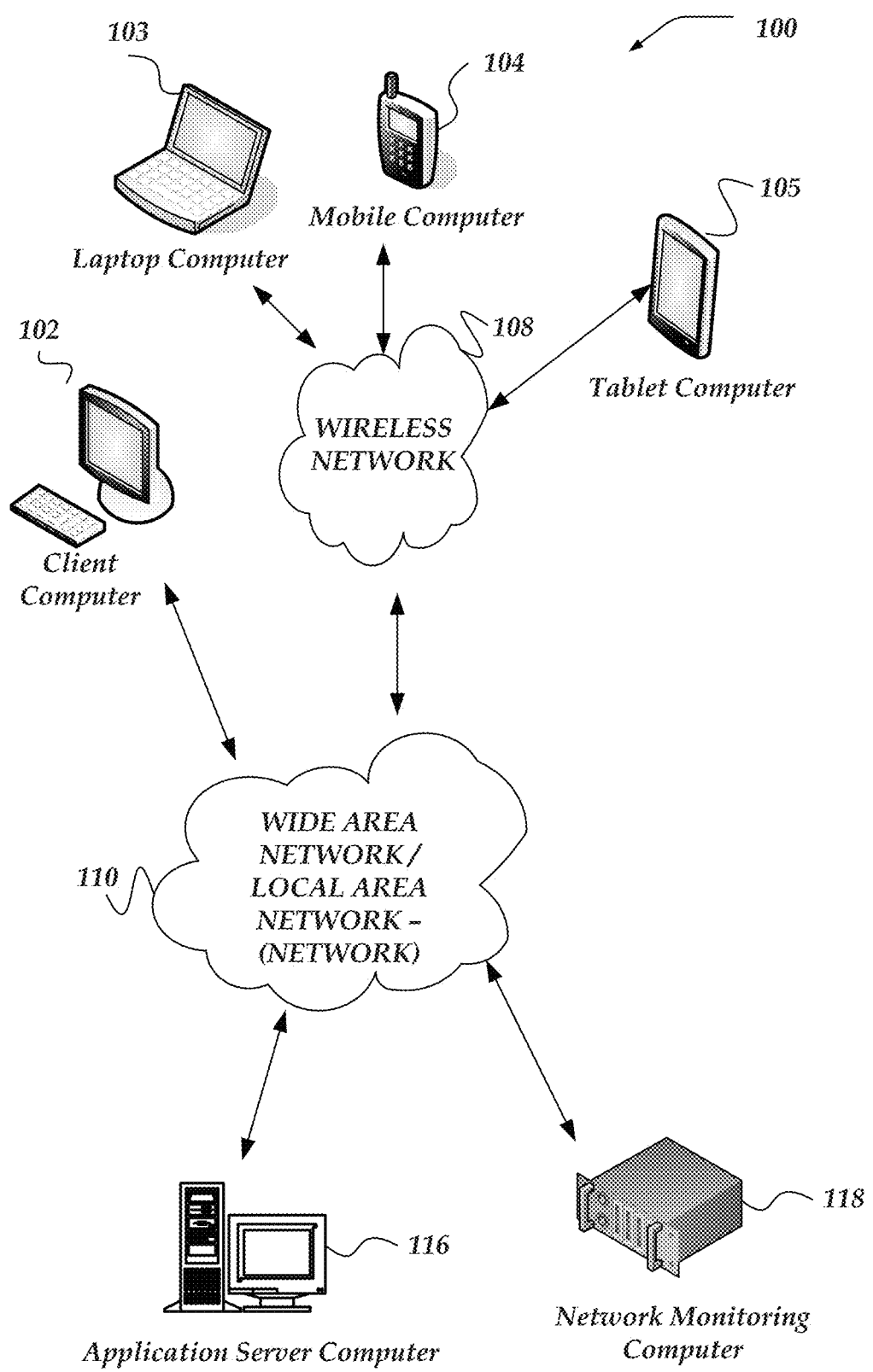
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft.NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiments, the NMC may passively monitor network packet traffic without participating in the communication protocols. This monitoring may be performed for a variety of reasons, including troubleshooting and proactive remediation, anomaly detection, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In addition, in one or more of the various embodiments, NMCs or NMC functionality may be implemented using hardware or software based proxy devices that may be arranged to intercept network traffic in the monitored networks rather than being restricted to passive (pass through) monitoring.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits.

The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "entity" refers to an actor in the monitored network. Entities may include applications, services, programs, processes, network devices, network computers, client computers, or the like, operating in the monitored network. For example, individual entities may include, web clients, web servers, database clients, database servers, mobile app clients, payment processors, groupware clients, groupware services, or the like. In some cases, multiple entities may co-exist on or in the same network computer, process, application, compute container, or cloud compute instance.

As used herein, the term "assets" refers to discrete items that users may access in a network, in addition to entities (as defined above), assets may include documents, directories, APIs or API-like services (e.g., REST endpoints, microservices, MSRPC/DCOM interfaces, or the like), database tables, media files or streams (e.g., images, video, audio, or the like), file systems, or the like. In many cases, assets may be uniquely identified by monitoring network traffic associated with creating assets, reading assets, updating assets, deleting assets, accessing assets, moving assets, or the like.

As used herein, the term "asset profile" refers to a data structure that represents the characteristics of assets that are discovered in networks monitored by NMCs. Values or fields in asset profiles may be based on metrics, network traffic characteristics, network footprints, or the like, that have been collected based on passive network monitoring of network traffic in one or more monitored networks. Also, in some cases, asset profiles may include configured or defined attributes that may be associated an asset.

As used herein, the term "asset type" refers to values associated with an asset that designates a class or category of assets. Asset types may represent ascending or descending levels of criticality, priority, importance, restriction, or the like, that may be associated with a given asset. Also, in some cases, asset type values may be associated with the role of the asset, the owners of the asset, organization department/group responsible for the asset, or the like. Asset type values may be included in asset profiles.

As used herein, the term "user profile" the term refers to a data structure that represent the characteristics of a user in a monitored network that may be a combination of information collected from monitoring network traffic associated with a user as well as other information associated with users, such as, assigned access roles, departments or roles within the organization, vital statistics, or the like.

As used herein, the "user role" refers to values associated with users that designate the user's role in an organization. Various roles may be associated with different levels of trust, access levels, organization departments, employee titles/roles, or the like. For example, a high-trust user role may be a role that designates an employee as an IT administrator. Also, the level of trust (or the like) associated with a user role may be context sensitive. For example, a user role of "human resource manager" may be considered high-trust with respect to assets associated with employee personal information and low-trust with respect to assets such as network configuration databases.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring network traffic using one or more network monitoring computers.

In one or more of the various embodiments, network traffic may be monitored to determine a plurality of users and a plurality of assets based on one or more characteristics of the network traffic. In one or more of the various embodiments, the plurality of assets may include one or more of entities, documents, directories, APIs or API-like services, REST endpoints, micro-services, MSRPC/DCOM interfaces, database tables, media files or streams, file systems, or the like.

In one or more of the various embodiments, a user role model may be employed to assign a user role and provide a role confidence score to each of the plurality of users based on a portion of the network traffic associated with the plurality of users.

In one or more of the various embodiments, an asset model may be employed to assign an asset type and provide an asset confidence score to each of the plurality of assets based on another portion of the network traffic associated with the plurality of assets.

In one or more of the various embodiments, one or more users of the plurality of users may be associated with one or more assets of the plurality of assets based on the network traffic.

In one or more of the various embodiments, the role confidence score provided to the one or more users may be modified based on the asset type assigned to the one or more assets associated with the one or more user. In one or more of the various embodiments, modifying the role confidence score may include: comparing a trust level associated with the one or more user roles with a restriction level associated with the one or more asset types; increasing the role confidence score when comparison indicates that the trust level is consistent with the restriction level; and decreasing the role confidence score when the comparison indicates that the trust level is inconsistent with the confidence score.

In one or more of the various embodiments, the asset confidence score provided for the one or more assets may be modified based on the user role assigned to the one or more users associated with the one or more assets. In one or more of the various embodiments, modifying the asset confidence score may include: comparing a trust level associated with the one or more user roles with a restriction level associated with the one or more asset types; increasing the asset confidence score when comparison indicates that the trust level is consistent with the restriction level; and decreasing the asset confidence score when the comparison indicates that the trust level is inconsistent with the confidence score.

In one or more of the various embodiments, one or more interactions between one or more of the plurality of users or the plurality of assets may be determined based on the monitored network traffic. In one or more of the various embodiments, the portion of the network traffic associated with the plurality of users may be determined based on the one or more interactions. And, in one or more of the various embodiments, the other portion of the network traffic associated with the plurality of assets may be determined based on the one or more interactions.

In one or more of the various embodiments, one or more interactions between one or more administrative users and the plurality of assets may be determined based on the monitored network traffic. In one or more of the various embodiments, one or more other interactions between one or more non-administrative users and the plurality of assets may be determined based on the monitored network traffic. And, in one or more of the various embodiments, one or more administrative assets may be determined based on the one or more interactions between the one or more administrative users and the plurality of assets such that the one or more interactions associated with the one or more administrative assets are associated with the one or more administrative users.

In one or more of the various embodiments, an asset type for an asset may be determined based on a similarity of one or more characteristics of the asset to one or more characteristics of the one or more other assets, wherein the asset type for the asset is determined based on the asset type of the similar one or more other assets.

In one or more of the various embodiments, a report that includes information about the one or more user roles and the one or more asset type may be provided.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HS-DPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations or embodiments are not so limited. For example, one or more functions of application server computer 116, network monitoring computer 118, or the like, may be distributed across one or more distinct network computers. Moreover, in one or more embodiment, network monitoring computer 118 may be implemented using a plurality of network computers. Further, in one or more of the various embodiments, application server computer 116, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
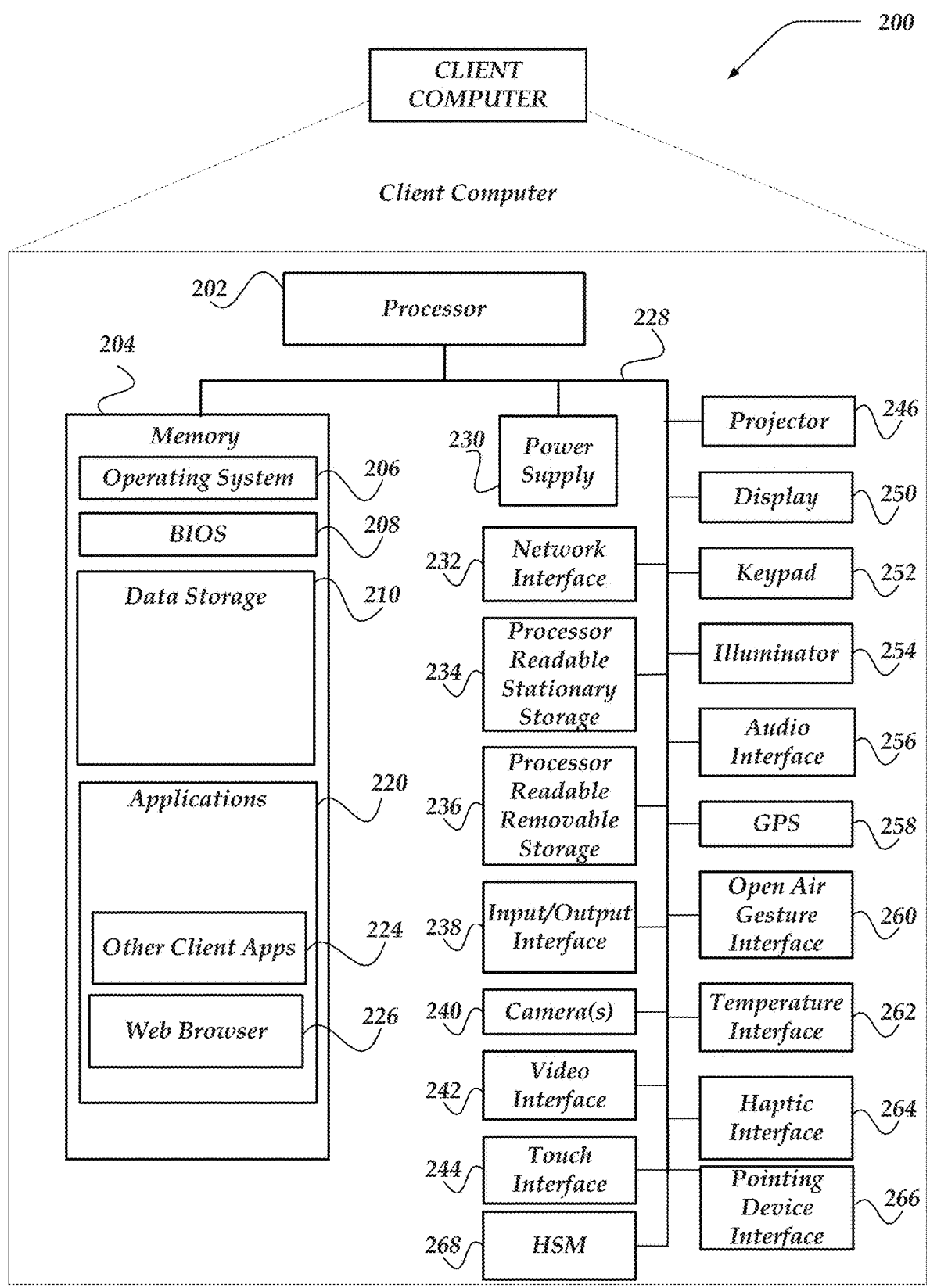
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
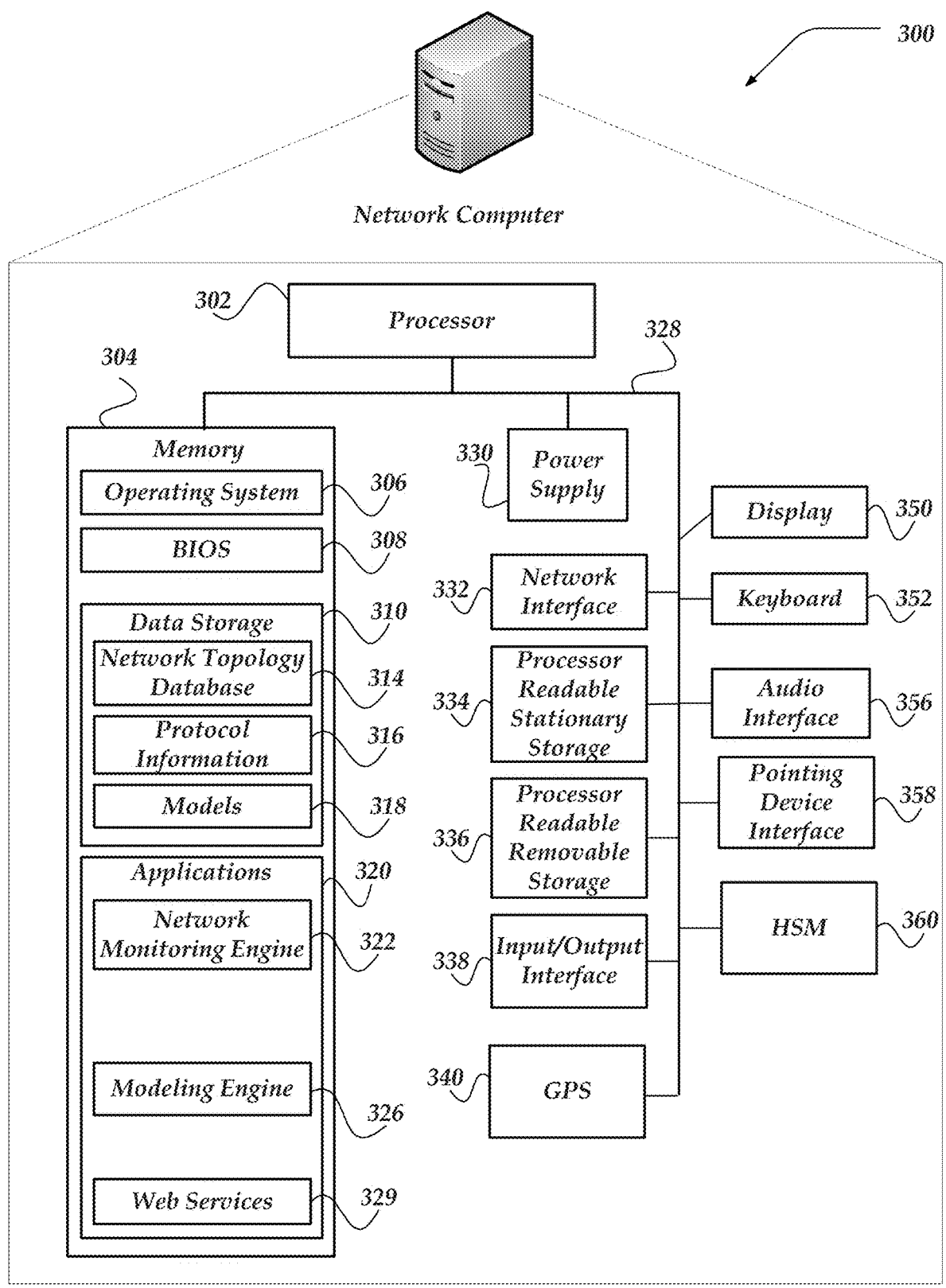
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, modeling engine 326, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, network topology database 314, protocol information 316, models 318, or the like. In some embodiments, network topology database 314 may be a data store that contains information related to the topology of one or more network monitored by a NMC, including one or more device relation models. And, protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity auto-discovery, anomaly detections, or the like, in a monitored network environment. Models 318 may be a data store that includes one or more asset models or user models as well as one or more previous classification results for one or more assets or one or more users.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, modeling engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, network monitoring engine 322, modeling engine 326, web services 329, or the like, may be operative in a cloud-based computing environment. In one or more of the various embodiments, these applications, and others, that comprise a network monitoring computer may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to network monitoring engine 322, modeling engine 326, web services 329, or the like, may be provisioned and de-commissioned automatically.

Also, in one or more of the various embodiments, network monitoring engine 322, modeling engine 326, web services 329, or the like, may be located in virtual servers running in a cloud-based computing environment rather than being tied to one or more specific physical network computers. Likewise, in some embodiments, one or more of network monitoring engine 322, modeling engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
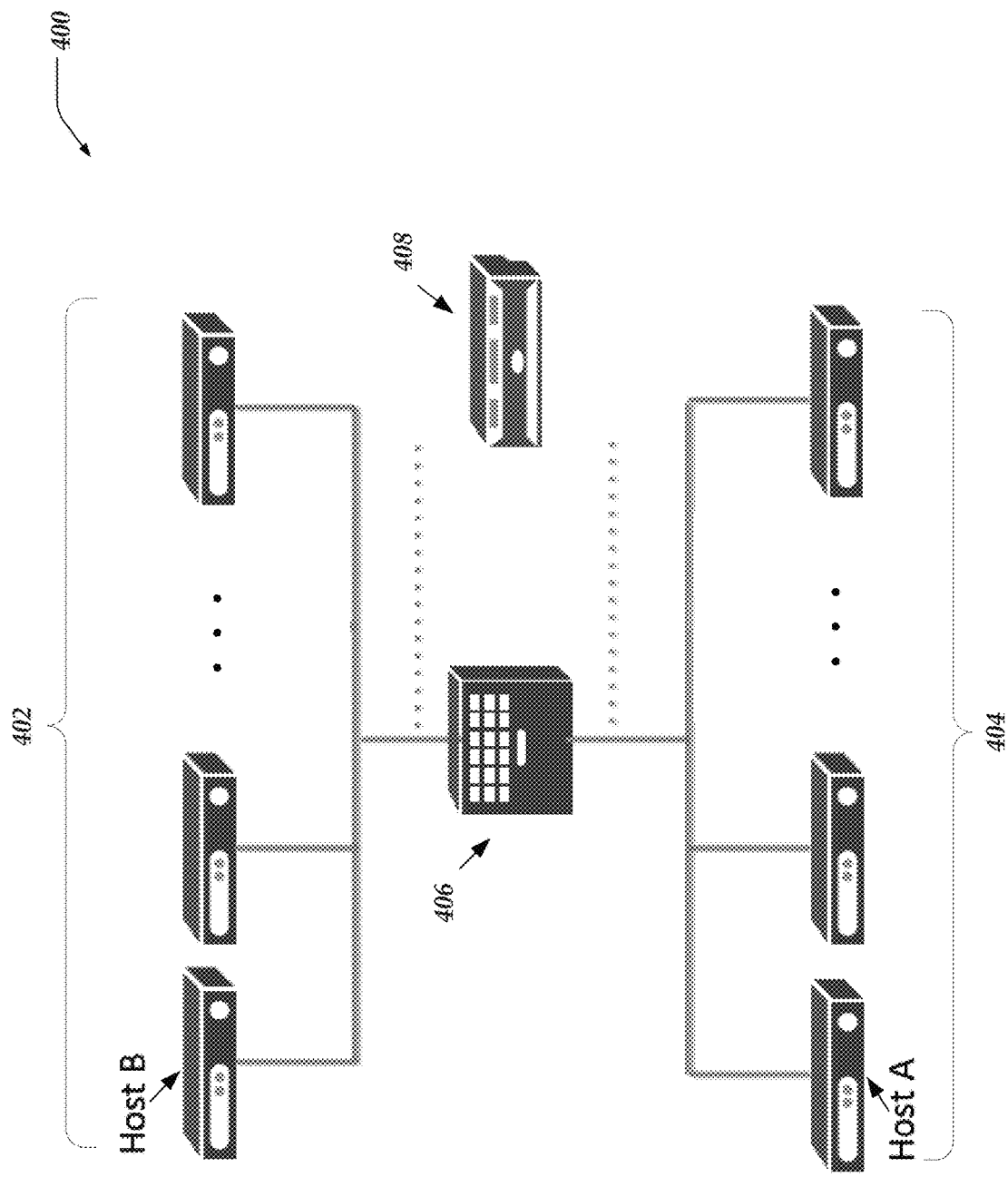
FIG. 4 illustrates a logical architecture of a system for automatic determination of user roles and asset types based on network monitoring in accordance with one or more of the various embodiments.

FIG. 4 illustrates a logical architecture of system 400 for automatic determination of user roles and asset types based on network monitoring in accordance with one or more of the various embodiments. System 400 may be arranged to include a plurality of network devices or network computers on first network 402 and a plurality of network devices or network computers on second network 404. In this example, communication between the first network and the second network is managed by switch 406. Also, NMC 408 may be arranged to passively monitor or record packets (network packets) that are communicated in network flows between network devices or network computers on first network 402 and second network 404. For example, the communication of flows of packets between the Host B network computer and the Host A network computer are managed by switch 406 and NMC 408 may be passively monitoring and recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

Figure 5:
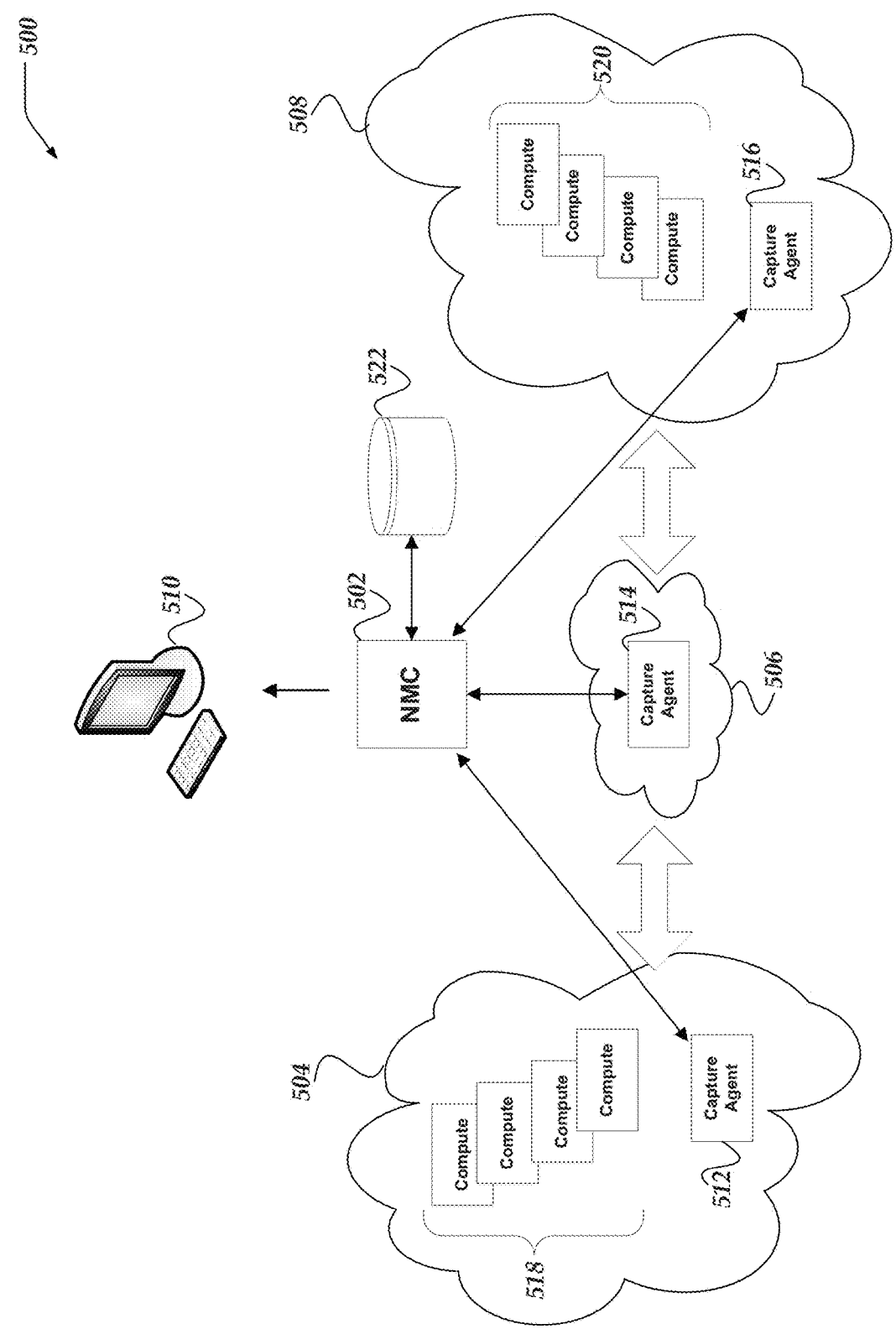
FIG. 5 illustrates a logical schematic of a system for automatic determination of user roles and asset types based on network monitoring in accordance with one or more of the various embodiments.

FIG. 5 illustrates a logical schematic of system 500 for automatic determination of user roles and asset types based on network monitoring in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, or the like, or combination thereof.

In one or more of the various embodiments, NMCs, such as NMC 502 may be arranged to communicate with one or more capture agents, such as, capture agent 512, capture agent 514, or capture agent 514. In some embodiments, capture agents may be arranged to selectively capture network traffic or collect network traffic metrics that may be provided to NMC 502 for additional analysis.

In one or more of the various embodiments, capture agents may be NMCs that are distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, capture agents may be selectively installed such that they may capture metrics for selected portions of the monitored networks. Also, in some embodiments, in networks that have groups or clusters of the same or similar entities, capture agents may be selectively installed on one or more entities that may be representative of entire groups or clusters of similar entities. Thus, in some embodiments, capture agents on the representative entities may collect metrics or traffic that may be used to infer the metrics or activity associated with similarly situated entities that do not include a capture agent.

Likewise, in one or more of the various embodiments, one or more capture agents may be installed or activated for a limited time period to collect information that may be used to infer activity information about the monitored networks. Accordingly, in one or more of the various embodiments, these one or more capture agents may be removed or de-activated if sufficient activity information or network traffic has been collected.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, switches, applications, services, containers, or the like, subject to network monitoring by one or more NMCs. (See, FIG. 4, as well).

In this example, for one or more of the various embodiments, capture agents, such as capture agent 512 may be arranged capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a captured data store, such as, captured data store 522.

Figure 6:
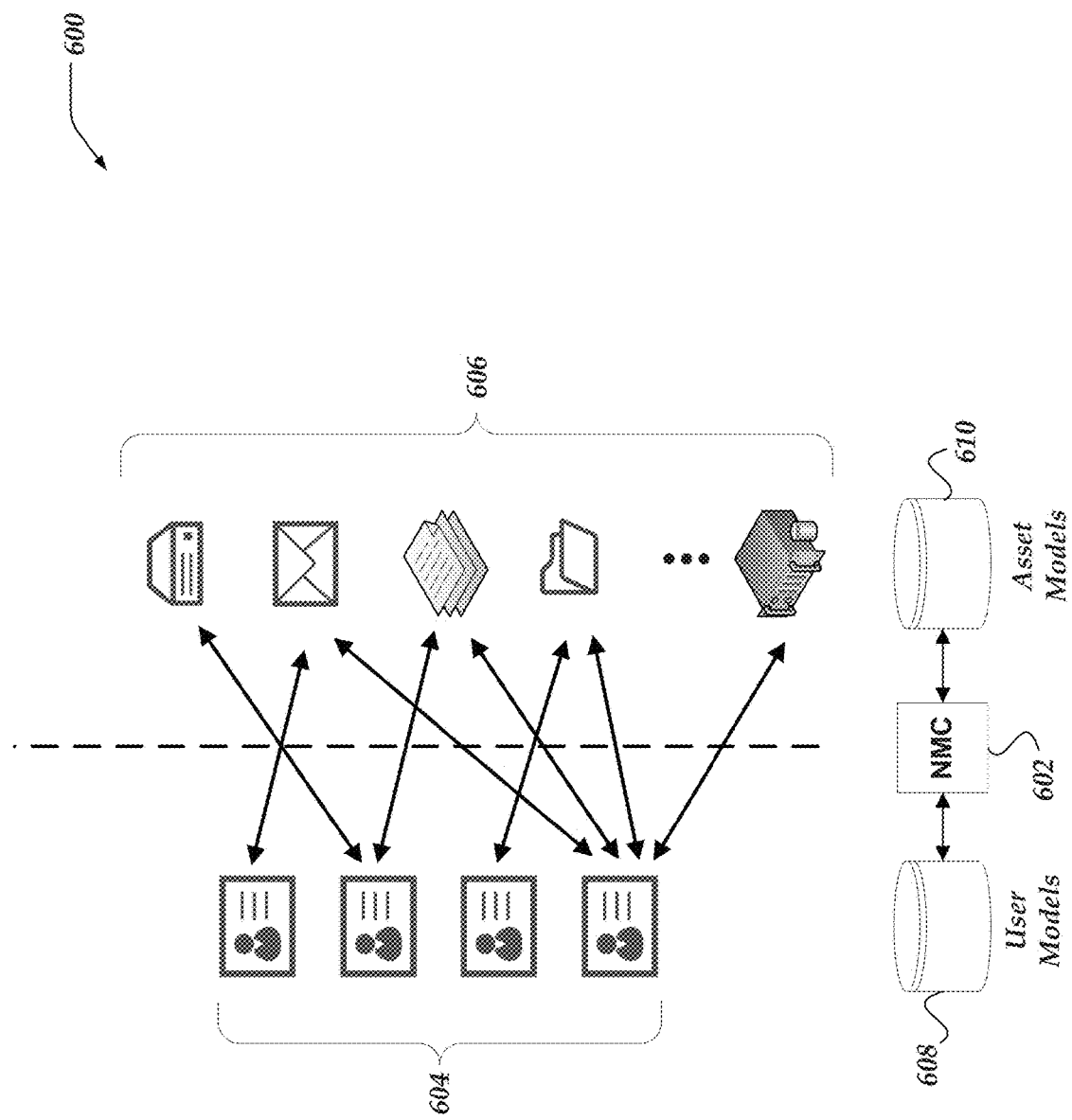
FIG. 6 illustrates a logical schematic of a system for automatic determination of user roles and asset types based on network monitoring in accordance with one or more of the various embodiments.

FIG. 6 illustrates a logical schematic of system 600 for automatic determination of user roles and asset types based on network monitoring in accordance with one or more of the various embodiments. In some embodiments, networks for an organization may be accessed by various users, such as, users 604. Also, in some embodiments, users 604 may access one or more assets in the network, such as, assets 606. Also, in one or more of the various embodiments, one or more NMCs, such as, NMC 602 may be arranged to monitor some or all of the network traffic that may occur between users 604 or assets 606. Accordingly, in one or more of the various embodiments, NMC 602 may be arranged to generate one or more machine learning models based on the monitored network traffic.

In some embodiments, user models data store 608 may include one or more machine learning models that infer information about one or more users based on network activity that may be associated with the one or more users. In some embodiments, user models data store 608 may store models that may be arranged to infer user roles for one or more users based network traffic that may be associated with the users.

Likewise, in some embodiments, asset models data store 610 may include one or more machine learning models that infer information about one or more assets based on network activity that may be associated with the assets. In some embodiments, asset models data store 610 may store models that may be arranged to infer asset types for one or more assets based network traffic that may be associated with the assets.

In one or more of the various embodiments, organizations may associate individual users, groups of users, classes of users, or the like, with one or more roles. In some embodiments, various activities in the network or access to various assets of the organization may be based on the roles that may be associated with users. Hereinafter referred to user roles. For example, in some embodiments, an organization may define various user roles such as administrator, manager, software developer, customer service, human resources, finance, or the like.

Likewise, in some embodiments, various networked assets may be associated with various protection levels, priority, access rights, or the like. In some embodiments, assets may be associated with or assigned a type based on the sensitivity or importance of the services provided by an assets or the sensitivity or importance of the data stored on the assets. Also, in some embodiments, assets may be grouped based on the portion of the organization that employs or supports the assets. Accordingly, in one or more of the various embodiments, organizations may associate user roles with users and employ those user roles to establish access privileges to various assets in the organization.

In one or more of the various embodiments, NMCs, such as, NMC 602 may be arranged to monitor network traffic that may be associate with users 604 or assets 606. In one or more of the various embodiments, NMCs may be arranged to distinguish network activity for various users in the network. Accordingly, in some embodiments, NMCs may be arranged to develop user profiles based on the monitored network activity. Likewise, in some embodiments, NMCs may be arranged to provide asset profiles based on the monitored network activity.

In one or more of the various embodiments, user profiles may be provided for users absent a determination of their user roles. However, in some embodiments, if a role has been determined for a user, that information may be included in the user profile or otherwise associated with the user. Likewise, in one or more of the various embodiments, asset profiles may be provided for assets absent a determination of the asset type. However, in some embodiments, if an asset type has been determined for an asset, that information may be included in the asset profile or otherwise associated with the asset.

Also, in one or more of the various embodiments, user profiles or asset profiles (profiles) may be continuously or periodically updated. In some embodiments, one or more profiles may be updated to reflect information learned or discovered by additional network monitoring. Likewise, in some embodiments, configuration changes associated with one or more users or one or more assets may be detected or provided. Thus, in one or more of the various embodiments, NMCs may be arranged to update profiles based on configuration changes. For example, in one or more of the various embodiments, employee A may be initially assigned a user role such as "IT intern" which may be granted rights or privileges appropriate for new or junior information technology employee, such as, access to some assets and not others. Continuing with this example, sometime later employee A may be promoted to "IT supervisor" which may be granted additional or different rights or privileges. Accordingly, in this example, NMCs may be arranged to update the user profiles of employee A to reflect the change.

Likewise, in some embodiments, asset profiles may be updated to reflect changes that may result in a change to asset types. For example, in some embodiments, an organization may convert non-restricted assets to restricted assets by installing applications that may be associated with critical services, sensitive data, or the like. Similarly, in one or more of the various embodiments, uninstalling applications associated with critical services, sensitive data, or the like, may convert restricted assets to non-restricted assets.

In one or more of the various embodiments, NMCs may be arranged to determine user roles based on network activity associated with users and assets. For example, in some embodiments, users that are observed accessing restricted assets may be inferred to have a user role that is enabled to access restricted assets. Likewise, in some embodiments, users that may be associated network activity commonly performed by administrative users, may be inferred to have an administrative user role.

In one or more of the various embodiments, user roles may be determined using one or more user models and some or all of the network traffic that may be associated with users or assets. In some embodiments, NMCs may be arranged to provide the network traffic information to one or more user models. Accordingly, in some embodiments, if network traffic information may be provided to one or more user models, user roles of the users associated with the network traffic information may be inferred. For example, in some embodiments, network traffic information associated with User A may be provided as input to a user model employed infer a user role for User A based on the network traffic information.

Likewise, in one or more of the various embodiments, asset types may be determined using one or more asset models and some or all of the network traffic that may be associated with users or assets. In some embodiments, NMCs may be arranged to provide the network traffic information to one or more asset models. Accordingly, in some embodiments, if network traffic information may be provided to one or more asset models, asset types of the assets the associated with the network traffic information may be inferred. For example, in some embodiments, network traffic information associated with Asset Q may be provided as input to a asset model employed to infer an asset type for Asset Q based on the network traffic information.

In one or more of the various embodiments, NMCs may be arranged to determine user roles based on the network activity associated with users rather than being limited to relying configuration information. Accordingly, in one or more of the various embodiments, NMCs may be arranged to associate users with user roles that may be in conflict with their assigned or configured role. For example, if an NMC observes a user configured to have a low-trust user role performing network activity typically associated with high-trust user roles, the NMCs may infer that the user has a high-trust user role. Accordingly, in this example, the NMCs may be arranged to generate report information that identifies the mismatch in the user's configured user role and the user's inferred user role.

Likewise, in one or more of the various embodiments, NMCs may be arranged to determine asset types based on the network activity associated with assets rather than being limited to relying on configuration information. Accordingly, in one or more of the various embodiments, NMCs may be arranged to associate assets with asset types that may be in conflict with their assigned or configured asset types. For example, if an NMC observes an asset configured to have an asset type associated with critical services being accessed by low-trust users, the inferred asset type may be an asset type associated with non-critical services rather that its configured type.

Accordingly, in one or more of the various embodiments, if there may be mismatches between inferred user roles and configured user roles, NMCs may be configured to take various actions based on configuration information. For example, in some embodiments, NMCs may be configured to generate 'mismatch' reports to notify organizations of mismatch conditions. Likewise, in some embodiments, NMCs may be arranged to perform similar actions for mismatches involving assets.

In one or more of the various embodiments, NMCs may be arranged to evaluate asset types in a greater context to determine if there may be asset type mismatch. For example, in some embodiments, an asset, such as, a spreadsheet, that is accessed almost exclusively by users with high-trust user roles may be discovered to be in stored in database or file system that is accessible by low-trust users. Accordingly, in this example, NMCs may be arranged to send a notification to information the organization that a critical asset is stored in an unrestricted location so the organization can take appropriate action.

Figure 7:
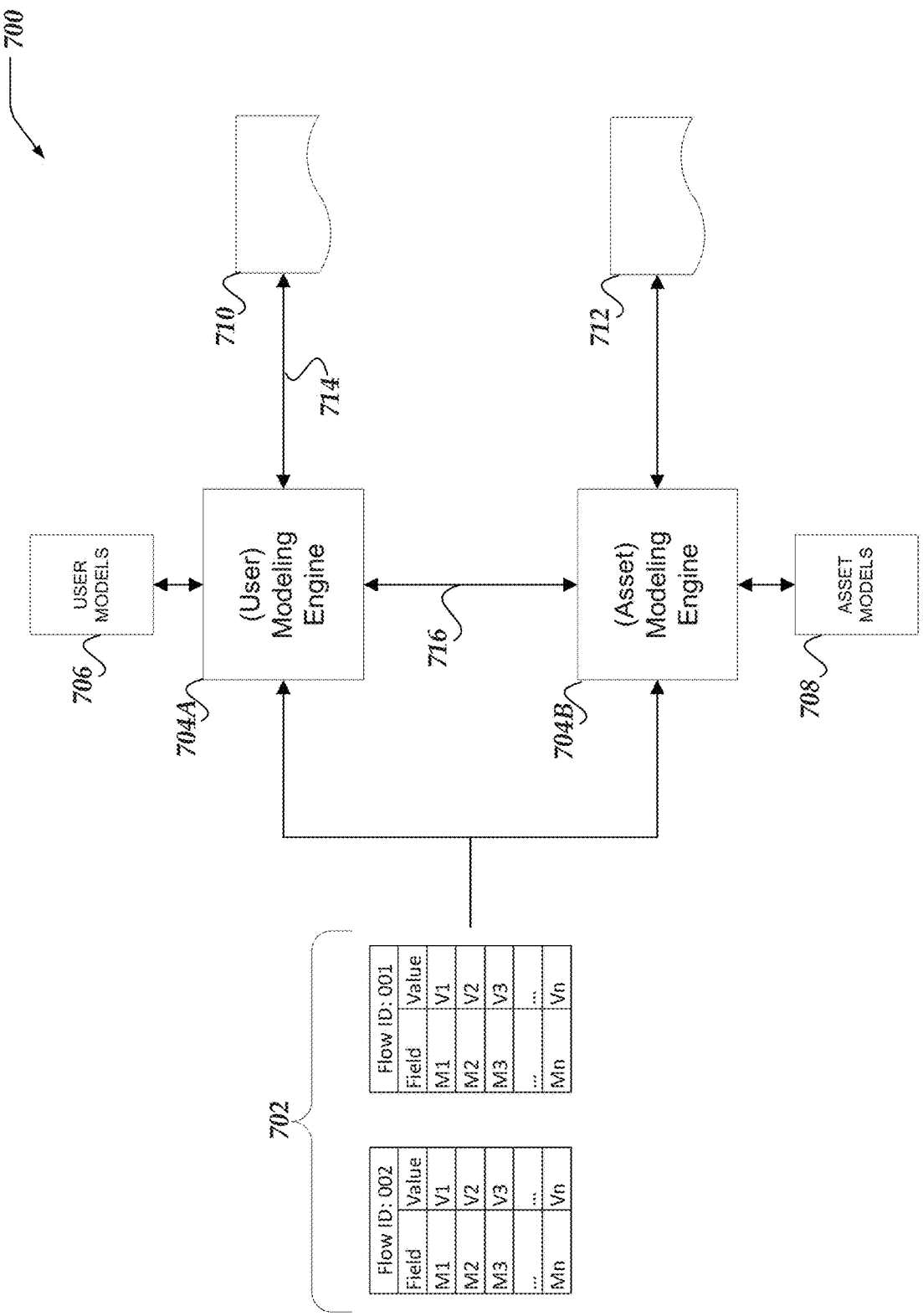
FIG. 7 illustrates a logical schematic of a system for automatic determination of user roles and asset types based on network monitoring in accordance with one or more of the various embodiments.

FIG. 7 illustrates a logical schematic of system 700 for automatic determination of user roles and asset types based on network monitoring in accordance with one or more of the various embodiments. In one or more of the various embodiments, systems, such as, system 700 may include flow information 702, that may be provided to modeling engine 704A or modeling engine 704B.

In one or more of the various embodiments, modeling engine 704A may be arranged to receive network flow information 702. Accordingly, modeling engine 704A may be arranged to employ one or more user models (e.g., user models 706) to predict or infer user roles based on network flow information 702. Likewise, in some embodiments, modeling engine 704B may be arranged to receive network flow information 702. Accordingly, in some embodiments, modeling engine 704B may be arranged to employ one or more asset models to predict or infer asset types based on network flow information 702.

In one or more of the various embodiments, modeling engines, such as modeling engine 704A, may be provided various inputs related to the network traffic or network activity that may be associated with users or assets. Accordingly, in one or more of the various embodiments, modeling engine 704A may employ one or more user models (e.g., user models 706) to infer the role of users (e.g., user roles).

Likewise, in one or more of the various embodiments, modeling engines, such as, modeling engine 704B may be provided various inputs related to the network traffic or network activity that may be associated with users or assets. Accordingly, in one or more of the various embodiments, modeling engine 704B may employ one or more asset models (e.g., asset models 708) to infer the type of assets.

In one or more of the various embodiments, modeling engines may be arranged to compare results of one type of model (e.g., user models) with the results of another type of model (e.g., asset models). Thus, in some embodiments, models may be arranged to employ inputs that may include values generated by other kinds of models. In this example, network pathway 716 represents the one or more communication pathways employed to exchange information or results associated with one type of model with another type of model.

In one or more of the various embodiments, modeling engines may be arranged to access some or all past results of the different models. Also, in some embodiments, modeling engines may be arranged to maintain a data store of time stamped results that may be included as inputs to models. Accordingly, in one or more of the various embodiments, past performance of other models may be employed to influence the current results of other models.

In one or more of the various embodiments, modeling engines may be arranged to provide report information that includes a classification or categorization of the assets or users. In some embodiments, models may be arranged to provide a confidence score that represents the strength of the inferences provided by the model. In some embodiments, one or more models may be arranged to provide probability distributions associated with inferences or categorizations generated by the one or more models rather than discrete values.

Accordingly, in some embodiments, report information associated with model results may be displayed or presented such that users may provide feedback associated with the report information. In this example, communication path 714 may represent the network path, API path, communication channel, or the like, that enables user feedback to be provided to modeling engine 704A or modeling engine 704B.

Accordingly, in some embodiments, modeling engines may be arranged to incorporate user feedback to evaluate, modify, or adapt one or more models based on the user feedback. In some embodiments, one or more models may be arranged to incorporate the user feedback as an input signal. In some embodiments, modeling engines may be arranged to weight or grade individual models based on the user feedback. For example, in some embodiments, modeling engines may be arranged to employ one or more models provided by third party or otherwise fixed or un-trainable. Thus, for example, user feedback may be employed to weight or filter the results produced by one or more models by the organization rather than retraining the models based on user feedback. Likewise, in some embodiments, modeling engines may be arranged to weight models or modify model results based on the user feedback rather than requiring a re-training cycle for the relevant models.

Also, in one or more of the various embodiments, one or more models may be arranged to include various hyper-parameters, weight values, constraints, or the like, that may be provided via configuration information. Accordingly, in some embodiments, organizations may be enabled to tune or modify one or more models in accord with local requirements or local preferences. Likewise, in some embodiments, one or more models or one or more portion of models may be provided as static libraries, shared libraries, dynamic-link libraries, plugins, extensions, or the like. Thus, in some embodiments, modeling engines may be arranged to load one or more models from configuration information, or the like.

In this example, for some embodiments, modeling engine 704A and modeling engine 704B are depicted as separate or distinct from each other. However, in some embodiments, one or more modeling engines may be arranged to accept inputs or provide results associated with either users or assets. Thus, in some embodiments, modeling engine 704A and modeling engine 704B may be considered to be the same engine. Also, one of ordinary skill in the art will appreciate that, in some embodiments, computing environments may employ one or more of processes, threads of execution, containerized process, virtual machines, cloud compute instances, or the like, or combination thereof, to execute one or more actions of one or more modeling engines.

Generalized Operations

Figure 8:
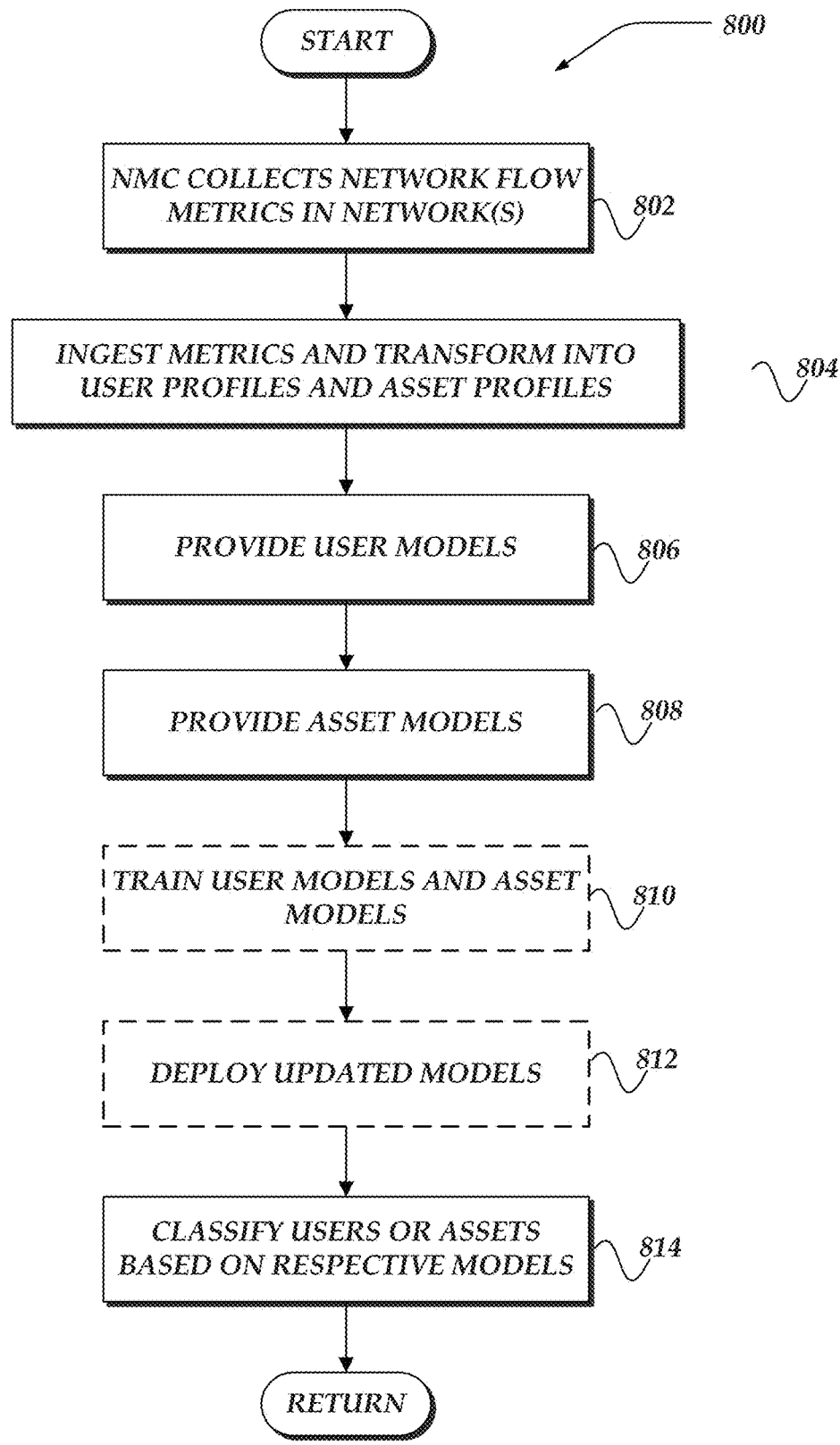
FIG. 8 illustrates an overview flowchart of a process for automatic determination of user roles and asset types based on network monitoring in accordance with one or more of the various embodiments.
Figure 9:
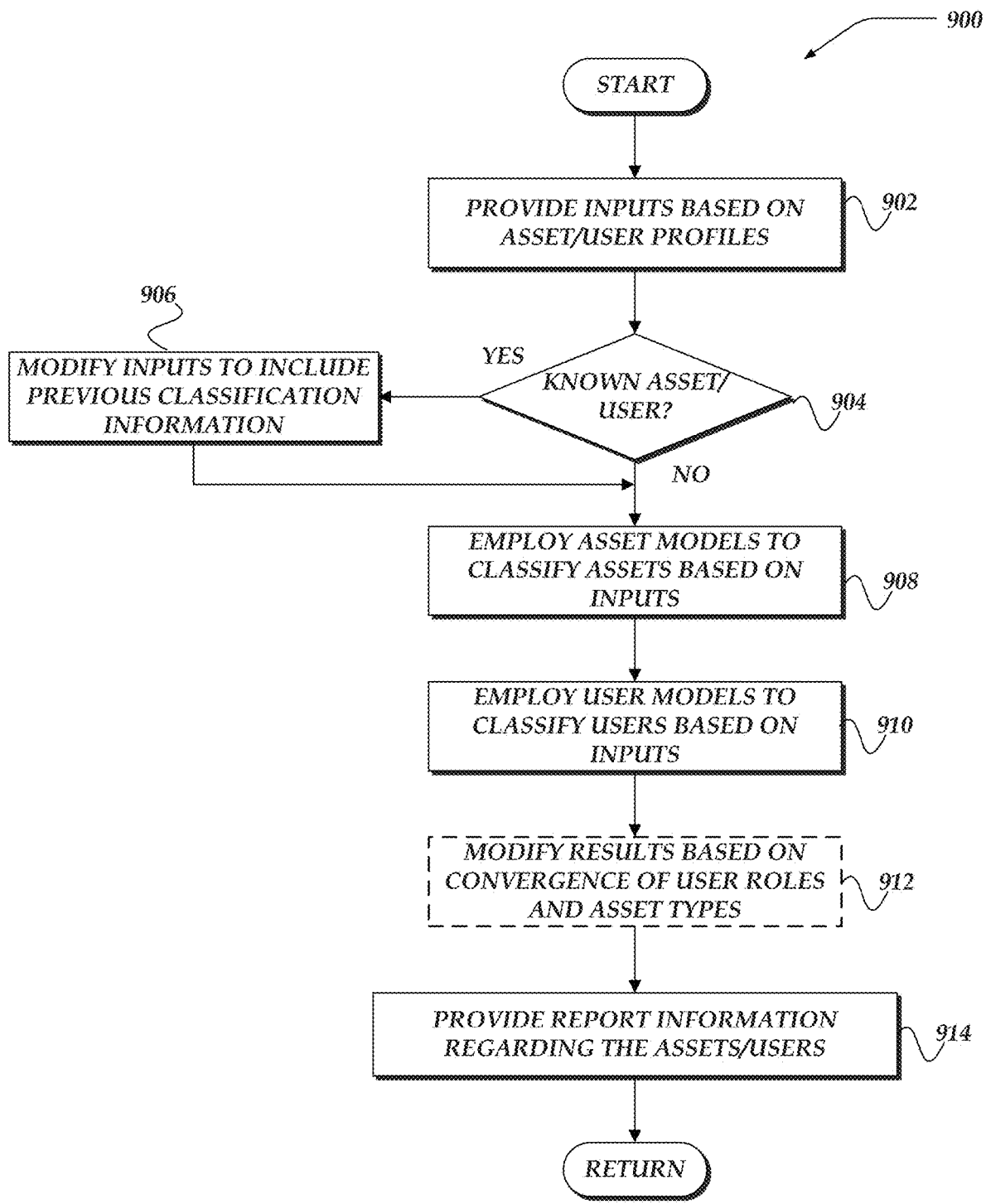
FIG. 9 illustrates a flowchart of a process for automatic determination of user roles and asset types in accordance with one or more of the various embodiments.
Figure 10:
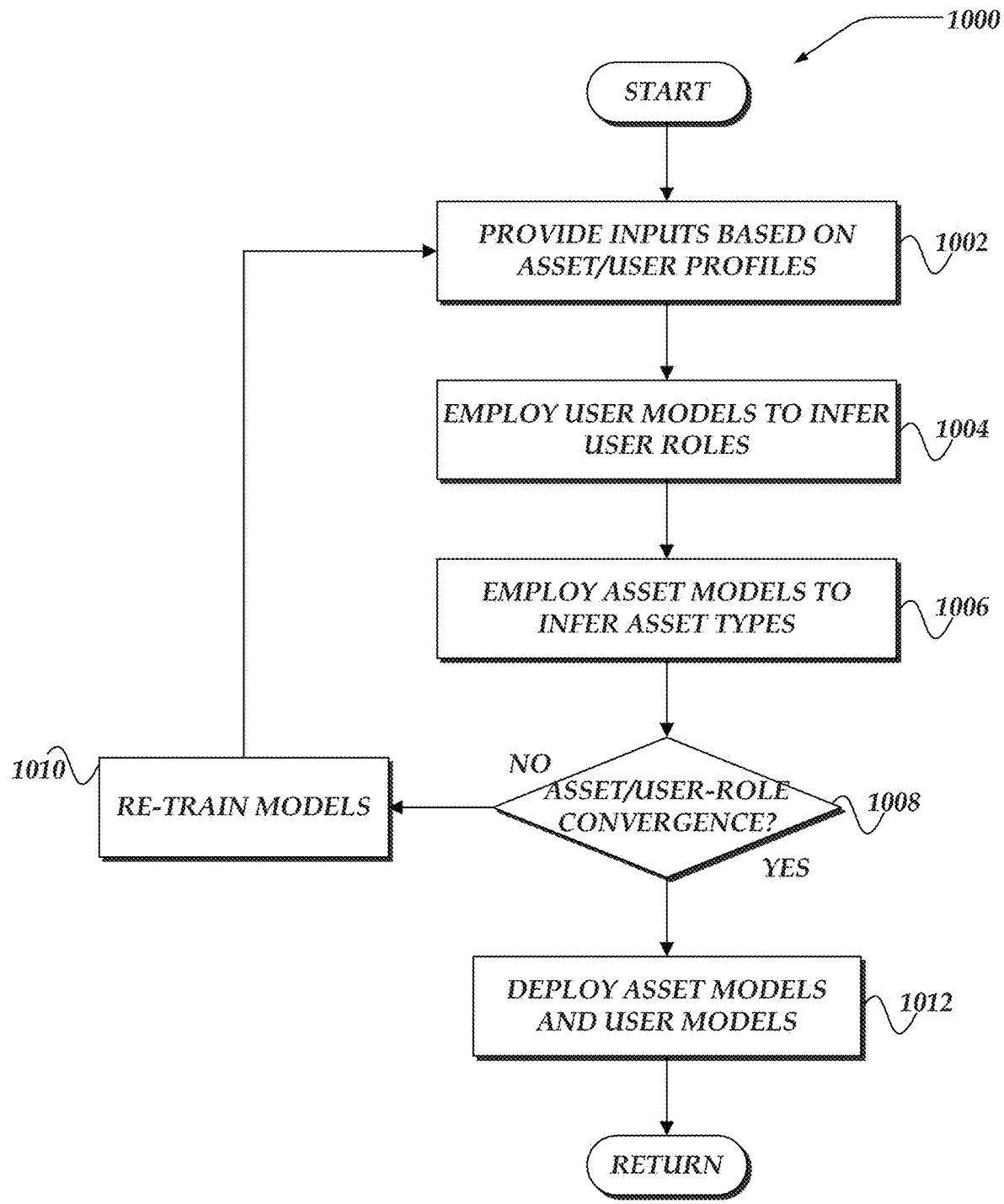
FIG. 10 illustrates a flowchart of a process for training or evaluation user models or asset model for automatic determination of user roles and asset types in accordance with one or more of the various embodiments.

FIGS. 8-10 represent generalized operations for automatic determination of user roles and asset types based on network monitoring in accordance with one or more of the various embodiments. In one or more of the various embodiments, processes 800, 900 and 1000 described in conjunction with FIGS. 8-10 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-10 may be used for automatic determination of user roles and asset types based on network monitoring based on network monitoring in accordance with at least one of the various embodiments or architectures such as those described in conjunction with FIGS. 4-7. Further, in one or more of the various embodiments, some or all of the actions performed by processes 800, 900, and 1000 may be executed in part by network monitoring engine 322, modeling engine 326, or the like, running on one or more processors of one or more network computers.

FIG. 8 illustrates an overview flowchart of process 800 for automatic determination of user roles and asset types based on network monitoring in accordance with one or more of the various embodiments. After a start block, at block 802, in one or more of the various embodiments, NMCs may be arranged to collect metrics based on monitoring network traffic.

In some embodiments, NMCs may be arranged to collect thousands of different metrics. In some embodiments, metrics may be grouped or otherwise organized based on protocols, networks, applications, or the like. For example, in some embodiments, an NMC may be arranged to collect metrics related to monitored HTTP traffic, such as, requests/second, method (e.g., GET, POST, PUT, or the like), response code, HTTP cookie information, payload size, response time, client network addresses, server network addresses, HTTP header values, number of abort connections, or the like. In one or more of the various embodiments, NMC may be arranged to execute configuration information, such as one or more policy rules that may select the particular metrics to monitor or collect. In one or more of the various embodiments, such configuration information may include scripts, programs, regular expressions, conditions, threshold values, condition dependent actions, or the like, or combination thereof. For example, in some embodiments, an NMC may be arranged to collect a base set of metrics until one or more conditions are met, triggering different or additional metrics to be captured.

At block 804, in one or more of the various embodiments, NMCs may be arranged to ingest some or all of the collected metrics for transformation into one or more of user profiles, asset profiles, flow profiles, or the like. In some embodiments, the profiles may be data structures arranged to be suitable for providing to user models or asset models for classification or training. In some embodiments, profiles may include some or all of the metric information that a network monitoring engine has collected from the monitored network traffic.

Also, in one or more of the various embodiments, because profiles may be associated with users, assets, entities, or activities that may be observed on the network, profiles may include one or more field values associated with one or more metrics provided by the NMCs based on the monitoring of the one or more networks.

At block 806, in one or more of the various embodiments, NMCs may be arranged to provide one or more user models. In one or more of the various embodiments, user models may be selected based on one or more characteristics, such as, priority, model type (e.g., binary classifiers, multiclass classifiers, regression models, or the like), precision, accuracy, performance considerations, age of the model, customer service agreement (e.g., some models may be unavailable depending license agreements with a user or customer), user access rights, or the like, or combination thereof. In one or more of the various embodiments, some profiles (e.g., flow profiles, user profiles, asset profiles, or the like) may be associated with a class, type, attribute, or category that may be associated with one or more user models.

At block 808, in one or more of the various embodiments, the NMC may be arranged to provide one or more asset models. In one or more of the various embodiments, asset models may be selected based on considerations similar to considerations made for providing user models as described above.

At block 810, in one or more of the various embodiments, optionally, the NMC may be arranged to train or re-train the one or more user models or the one or more asset models using some or all of the profiles. Accordingly, in one or more of the various embodiments, modeling engines, such as, modeling engine 326 may be arranged to train one or more of user models or asset models. In one or more of the various embodiments, the particular actions performed for training models may depend on type of model (e.g., linear regression, deep learning, deep neural networks, decision trees, ensembles of two or more models, or the like). In some embodiments, modeling engines may be arranged to determine the particular re-training methods based on rules, plugins, libraries, or the like, provided via configuration information.

In one or more of the various embodiments, this block may be considered optional because in some embodiments, some or all models may not require training or re-training at this point.

At block 812, in one or more of the various embodiments, optionally, trained user models or asset models may be deployed for evaluating users (e.g., user roles) or assets based on network activity.

In one or more of the various embodiments, this block may be considered optional because in some embodiments, trained user models or asset models may have been previously deployed.

At block 814, in one or more of the various embodiments, NMCs may be arranged to evaluate users to assign user roles based on the one or more user models. Likewise, in some embodiments, NMCs may be arranged to evaluate assets to assign asset types based on the one or more asset models.

In one or more of the various embodiments, result information may be provided as report information that may be shared with other services or components based on configuration information.

Next, control may be returned to a calling process.

FIG. 9 illustrates a flowchart of process 900 for automatic determination of user roles and asset types in accordance with one or more of the various embodiments. After a start block, at block 902, in one or more of the various embodiments, inputs based on asset profiles or user profiles may be provided. As described above, NMCs may be arranged to generate user profiles, asset profiles, network flow profiles, or the like, based on monitoring networking traffic. In one or more of the various embodiments, profiles may be data structures that include one or more values that may be provided as inputs to one or more user models or asset models.

At decision block 904, in one or more of the various embodiments, if the provided profiles are associated with one or more known assets or one or more known users, control may flow to block 906; otherwise, control may flow to 908.

In some embodiments, user roles for one or more user profiles may have been previously classified based on one or more user models. In some cases, NMCs may be arranged to identify previously processed user profiles based on one or more values included in or associated with the user profiles. In some embodiments, user profiles may include user identifiers, timestamps, configured role information, user model determined user role information, user feedback information, or the like. Accordingly, for example, a user profile may indicate that the user role was inferred by one or more user models at a specific time.

Likewise, in some embodiments, asset types for one or more asset profiles may have been previously classified based on one or more asset models. In some cases, NMCs may be arranged to identify previously processed asset profiles based on one or more values included in or associated with the asset profiles. In some embodiments, asset profiles may include asset identifiers, timestamps, configured asset type information, model determined asset type information, user feedback information, or the like. Accordingly, for example, an asset profile may indicate that the asset type was inferred by one or more asset models at a specific time.

At block 906, in one or more of the various embodiments, modeling engines may be arranged to modify one or more of the inputs to include previous classification information that may be associated with the known assets or users.

In one or more of the various embodiments, modeling engines or one or more user models may be arranged to accept input values associated with previous made user role inferences of the same or other user models. For example, if a previous classification action determined a user role and confidence score for the same user/user profile, a user model may be arranged to consider this information in its classification. Similarly, one or more asset models may be arranged to accept inputs based on previous inferences of the same or other asset models.

Also, in one or more of the various embodiments, modeling engines may be arranged to provide inputs to one or more user models based on asset type inferences provided by asset models. Accordingly, in one or more of the various embodiments, one or more user models may be arranged to compare user role inference results with asset type inference results provided by asset models. For example, in one or more of the various embodiments, if a user model infers that a user has a user role that is associated with accessing restricted assets, the asset model generated asset type of assets accessed by the user may be considered as well. Thus, in this example, an inference that a user has a high-trust user role may be reinforced by increasing its confidence score if the user has a history of accessing assets that have been classified as restricted assets by one or more asset models.

Likewise, in one or more of the various embodiments, modeling engines may be arranged to provide inputs to one or more asset models based on user role inferences provided by user models. Accordingly, in one or more of the various embodiments, one or more asset models may be arranged to compare asset type inference results with user role inference results provided by user models. For example, in one or more of the various embodiments, if an asset model infers that a asset has an asset type considered to be restricted, the user model generated user roles of users that access the asset may be considered as well. Thus, in this example, an inference that an asset is a restricted asset may be reinforced if the users that have a history of accessing the asset have been classified as having high-trust user roles by one or more user models.

At block 908, in one or more of the various embodiments, the modeling engines may be arranged to employ one or more asset models to classify one or more assets based on the inputs. As described above, one or more asset models may be employed to infer asset types for one or more assets based on the inputs.

At block 910, in one or more of the various embodiments, the modeling engines may be arranged to employ one or more user models to classify one or more users based on the inputs. As described above, one or more user models may be employed to infer user roles for one or more users based on the inputs.

At block 912, in one or more of the various embodiments, the modeling engines may provide report information regarding the classification of the assets or the classification of the users. As described above, report information that includes results based on the inferences provided by the one or more user models or the one or more asset models. In some embodiments, NMCs may be arranged to apply various rules or conditions provided via configuration information to determine the type of reports or the contents of reports. For example, in one or more of the various embodiments, one or more rules may require that NMCs generate alerts if critical assets are being accessed by users with a non-trusted user-roles. Likewise, for example, other rules may cause NMCs to generate a notification if a critical asset is discovered in a non-trusted location.

Next, in one or more of the various embodiments, control may be returned to a calling process.

FIG. 10 illustrates a flowchart of process 1000 for training or evaluation user models or asset model for automatic determination of user roles and asset types in accordance with one or more of the various embodiments. After a start block, at block 1002, in one or more of the various embodiments, inputs based on asset profiles or user profiles may be provided. As described above, NMCs may be arranged to generate user profiles, asset profiles, network flow profiles, or the like, based on monitoring networking traffic. In one or more of the various embodiments, profiles may be data structures that include one or more values that may be provided as inputs to one or more user models or asset models.

In one or more of the various embodiments, the inputs may be based on live or real-time network traffic. Also, in some embodiments, the inputs may be based on training data that has been collected or curated previously.

At block 1004, in one or more of the various embodiments, NMCs may be arranged to employ one or more user models to infer user roles for the users based on the user profiles. As described above, in some embodiments, modeling engines may be arranged to provide user profiles as inputs to user models that are configured to determine (or infer) a user role of the users based on their associated user profile.

At block 1006, in one or more of the various embodiments, NMCs may be arranged to employ one or more asset models to infer asset types. As described above, in some embodiments, modeling engines may be arranged to provide asset profiles as inputs to asset models that are configured to determine (or infer) an asset type of the assets based on their associated asset profile.

At decision block 1008, in one or more of the various embodiments, if the asset types and user roles produced by the asset models and the user model exhibit a convergence, control may flow to block 1012; otherwise, control may flow to block 1010.

In one or more of the various embodiments, modeling engines may be arranged to compare if the inferred user roles or the users that access the assets may be consistent with the asset types that may be inferred for the those assets.

For example, in some embodiments, if an asset model infers that an asset is a critical asset type, it should be expected that the users accessing such assets have high-trust user roles. Likewise, if a user model infers that one or more users have high-trust user roles, it should be expected that those users will be observed accessing critical or restricted assets.

Accordingly, in one or more of the various embodiments, modeling engines may be arranged to compare if the user roles inferred by user models and asset types inferred by asset model are consistent. For example, if users that have been classified as being low trust users (e.g., associated with low trust user roles) are observed accessing assets that have been classified as critical asset types, either the user model or the asset model may be producing false inferences.

At block 1010, in one or more of the various embodiments, user models or asset models that produce inconsistent results may be designated for re-training. In one or more of the various embodiments, re-training may be considered to include conventional assisted or unassisted machine learning that is tailored to the particular type of model. Also, in some embodiments, here re-training may include other ad-hoc modifications to models based on empirical evidence or expert knowledge. For example, in some embodiments, weights or hyper-parameters associated with one or more divergent or inconsistent models may be modified rather than subject models to conventional re-training.

At block 1012, in one or more of the various embodiments, modeling engines may be arranged to deploy the asset models or user models for automatic determination of user roles and asset profiles based on network monitoring.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring network traffic using one or more network monitoring computers, comprising:
    monitoring network traffic to determine a plurality of users and a plurality of assets based on one or more characteristics of the network traffic;
    employing a user role model to assign a user role and provide a role confidence score to each of the plurality of users based on a portion of the network traffic associated with the plurality of users, wherein one or more previously determined inferences for the user role or previously determined inferences for the role confidence score are associated with the user role model;
    employing an asset model to assign an asset type and provide an asset confidence score to each of the plurality of assets based on another portion of the network traffic associated with the plurality of assets, wherein one or more previously determined inferences for the asset type or previously determined inferences for the asset confidence score are associated with the asset model;
    associating one or more users of the plurality of users with one or more assets of the plurality of assets based on the network traffic;
    comparing the one or more previously determined inferences of the user role to the one or more previously determined inferences of the asset type;
    modifying the role confidence score provided to the one or more users based on the asset type assigned to the one or more assets associated with the one or more users and a result of the comparison;
    modifying the asset confidence score provided to the one or more assets based on the user role assigned to the one or more users associated with the one or more assets and the result of the comparison; and
    employing geolocation information provided by a global positioning system (GPS) device to select one or more features, including a time zone, spoken language, or calendar format that is used in or more of monitoring network traffic, user interfaces, or databases to provide a report that includes information about the result of the comparison, the one or more user roles, and the one or more asset types.

2. The method of claim 1, wherein modifying the role confidence score further comprises:
    comparing a trust level associated with the one or more user roles with a restriction level associated with the one or more asset types;
    increasing the role confidence score when comparison indicates that the trust level is consistent with the restriction level; and
    decreasing the role confidence score when the comparison indicates that the trust level is inconsistent with the confidence score.

3. The method of claim 1, wherein modifying the asset confidence score further comprises:
    comparing a trust level associated with the one or more user roles with a restriction level associated with the one or more asset types;
    increasing the asset confidence score when comparison indicates that the trust level is consistent with the restriction level; and
    decreasing the asset confidence score when the comparison indicates that the trust level is inconsistent with the confidence score.

4. The method of claim 1, further comprising:
    determining one or more interactions between one or more of the plurality of users or the plurality of assets based on the monitored network traffic;
    determining the portion of the network traffic associated with the plurality of users based on the one or more interactions; and determining the other portion of the network traffic associated with the plurality of assets based on the one or more interactions.

5. The method of claim 1, further comprising:
determining one or more interactions between one or more administrative users and the plurality of assets based on the monitored network traffic;
determining one or more other interactions between one or more non-administrative users and the plurality of assets based on the monitored network traffic; and
determining one or more administrative assets based on the one or more interactions between the one or more administrative users and the plurality of assets, wherein the one or more interactions associated with the one or more administrative assets are associated with the one or more administrative users.

6. The method of claim 1, further comprising, determining an asset type for an asset based on a similarity of one or more characteristics of the asset to one or more characteristics of the one or more other assets, wherein the asset type for the asset is determined based on the asset type of the similar one or more other assets.

7. The method of claim 1, wherein the plurality of assets further comprise one or more of entities, documents, directories, APIs, REST endpoints, micro-services, MSRPC/DCOM interfaces, database tables, media files or streams, or file systems.

8. A network monitoring computer (NMC) for monitoring network traffic between one or more computers, comprising:
a transceiver that communicates over the network;
a memory that stores at least instructions; and
one or more processors that execute instructions that perform actions, including:
monitoring network traffic to determine a plurality of users and a plurality of assets based on one or more characteristics of the network traffic;
employing a user role model to assign a user role and provide a role confidence score to each of the plurality of users based on a portion of the network traffic associated with the plurality of users, wherein one or more previously determined inferences for the user role or previously determined inferences for the role confidence score are associated with the user role model;
employing an asset model to assign an asset type and provide an asset confidence score to each of the plurality of assets based on another portion of the network traffic associated with the plurality of assets, wherein one or more previously determined inferences for the asset type or previously determined inferences for the asset confidence score are associated with the asset model;
associating one or more users of the plurality of users with one or more assets of the plurality of assets based on the network traffic;
comparing the one or more previously determined inferences of the user role to the one or more previously determined inferences of the asset type;
modifying the role confidence score provided to the one or more users based on the asset type assigned to the one or more assets associated with the one or more users and a result of the comparison;
modifying the asset confidence score provided to the one or more assets based on the user role assigned to the one or more users associated with the one or more assets and the result of the comparison; and
employing geolocation information provided by a global positioning system (GPS) device to select one or more features, including a time zone, spoken language, or calendar format that is used in or more of monitoring network traffic, user interfaces, or databases to provide a report that includes information about the result of the comparison, the one or more user roles, and the one or more asset types.

9. The NMC of claim 8, wherein modifying the role confidence score further comprises:
comparing a trust level associated with the one or more user roles with a restriction level associated with the one or more asset types;
increasing the role confidence score when comparison indicates that the trust level is consistent with the restriction level; and
decreasing the role confidence score when the comparison indicates that the trust level is inconsistent with the confidence score.

10. The NMC of claim 8, wherein modifying the asset confidence score further comprises:
comparing a trust level associated with the one or more user roles with a restriction level associated with the one or more asset types;
increasing the asset confidence score when comparison indicates that the trust level is consistent with the restriction level; and
decreasing the asset confidence score when the comparison indicates that the trust level is inconsistent with the confidence score.

11. The NMC of claim 8, further comprising:
determining one or more interactions between one or more of the plurality of users or the plurality of assets based on the monitored network traffic;
determining the portion of the network traffic associated with the plurality of users based on the one or more interactions; and
determining the other portion of the network traffic associated with the plurality of assets based on the one or more interactions.

12. The NMC of claim 8, further comprising:
determining one or more interactions between one or more administrative users and the plurality of assets based on the monitored network traffic;
determining one or more other interactions between one or more non-administrative users and the plurality of assets based on the monitored network traffic; and
determining one or more administrative assets based on the one or more interactions between the one or more administrative users and the plurality of assets, wherein the one or more interactions associated with the one or more administrative assets are associated with the one or more administrative users.

13. The NMC of claim 8, further comprising, determining an asset type for an asset based on a similarity of one or more characteristics of the asset to one or more characteristics of the one or more other assets, wherein the asset type for the asset is determined based on the asset type of the similar one or more other assets.

14. The NMC of claim 8, wherein the plurality of assets further comprise one or more of entities, documents, directories, APIs, REST endpoints, micro-services, MSRPC/DCOM interfaces, database tables, media files or streams, or file systems.

15. A processor readable non-transitory storage media that includes instructions for monitoring network traffic using one or more network monitoring computers (NMC), wherein execution of the instructions by the one or more NMCs perform the method comprising:
  monitoring network traffic to determine a plurality of users and a plurality of assets based on one or more characteristics of the network traffic;
  employing a user role model to assign a user role and provide a role confidence score to each of the plurality of users based on a portion of the network traffic associated with the plurality of users, wherein one or more previously determined inferences for the user role or previously determined inferences for the role confidence score are associated with the user role model;
  employing an asset model to assign an asset type and provide an asset confidence score to each of the plurality of assets based on another portion of the network traffic associated with the plurality of assets, wherein one or more previously determined inferences for the asset type or previously determined inferences for the asset confidence score are associated with the asset model;
  associating one or more users of the plurality of users with one or more assets of the plurality of assets based on the network traffic;
  comparing the one or more previously determined inferences of the user role to the one or more previously determined inferences of the asset type;
  modifying the role confidence score provided to the one or more users based on the asset type assigned to the one or more assets associated with the one or more users and a result of the comparison;
  modifying the asset confidence score provided to the one or more assets based on the user role assigned to the one or more users associated with the one or more assets and the result of the comparison; and
  employing geolocation information provided by a global positioning system (GPS) device to select one or more features, including a time zone, spoken language, or calendar format that is used in or more of monitoring network traffic, user interfaces, or databases to provide a report that includes information about the result of the comparison, the one or more user roles, and the one or more asset types.

16. The media of claim 15, wherein modifying the role confidence score further comprises:
  comparing a trust level associated with the one or more user roles with a restriction level associated with the one or more asset types;
  increasing the role confidence score when comparison indicates that the trust level is consistent with the restriction level; and
  decreasing the role confidence score when the comparison indicates that the trust level is inconsistent with the confidence score.

17. The media of claim 15, wherein modifying the asset confidence score further comprises:
  comparing a trust level associated with the one or more user roles with a restriction level associated with the one or more asset types;
  increasing the asset confidence score when comparison indicates that the trust level is consistent with the restriction level; and
  decreasing the asset confidence score when the comparison indicates that the trust level is inconsistent with the confidence score.

18. The media of claim 15, further comprising:
  determining one or more interactions between one or more of the plurality of users or the plurality of assets based on the monitored network traffic;
  determining the portion of the network traffic associated with the plurality of users based on the one or more interactions; and
  determining the other portion of the network traffic associated with the plurality of assets based on the one or more interactions.

19. The media of claim 15, further comprising:
  determining one or more interactions between one or more administrative users and the plurality of assets based on the monitored network traffic;
  determining one or more other interactions between one or more non-administrative users and the plurality of assets based on the monitored network traffic; and
  determining one or more administrative assets based on the one or more interactions between the one or more administrative users and the plurality of assets, wherein the one or more interactions associated with the one or more administrative assets are associated with the one or more administrative users.

20. The media of claim 15, further comprising, determining an asset type for an asset based on a similarity of one or more characteristics of the asset to one or more characteristics of the one or more other assets, wherein the asset type for the asset is determined based on the asset type of the similar one or more other assets.

21. The media of claim 15, wherein the plurality of assets further comprise one or more of entities, documents, directories, APIs, REST endpoints, micro-services, MSRPC/DCOM interfaces, database tables, media files or streams, or file systems.

22. A system for monitoring network traffic in a network:
  one or more network monitoring computers (NMCs), comprising:
    a transceiver that communicates over the network;
    a memory that stores at least instructions; and
    one or more processors that execute instructions that perform actions, including:
      monitoring network traffic to determine a plurality of users and a plurality of assets based on one or more characteristics of the network traffic;
      employing a user role model to assign a user role and provide a role confidence score to each of the plurality of users based on a portion of the network traffic associated with the plurality of users, wherein one or more previously determined inferences for the user role or previously determined inferences for the role confidence score are associated with the user role model;
      employing an asset model to assign an asset type and provide an asset confidence score to each of the plurality of assets based on another portion of the network traffic associated with the plurality of assets, wherein one or more previously determined inferences for the asset type or previously determined inferences for the asset confidence score are associated with the asset model;
      associating one or more users of the plurality of users with one or more assets of the plurality of assets based on the network traffic;
      comparing the one or more previously determined inferences of the user role to the one or more previously determined inferences of the asset type;
      modifying the role confidence score provided to the one or more users based on the asset type assigned to the one or more assets associated with the one or more users and a result of the comparison;

modifying the asset confidence score provided to the one or more assets based on the user role assigned to the one or more users associated with the one or more assets and the result of the comparison; and employing geolocation information provided by a global positioning system (GPS) device to select one or more features, including a time zone, spoken language, or calendar format that is used in or more of monitoring network traffic, user interfaces, or databases to provide a report that includes information about the result of the comparison, the one or more user roles, and the one or more asset types; and one or more client computers, comprising:
a transceiver that communicates over the network;
a memory that stores at least instructions; and
one or more processors that execute instructions that perform actions, including:
providing one or more portions of the portion of the network traffic associated with the plurality of users.

23. The system of claim 22, wherein modifying the role confidence score further comprises:

comparing a trust level associated with the one or more user roles with a restriction level associated with the one or more asset types;

increasing the role confidence score when comparison indicates that the trust level is consistent with the restriction level; and decreasing the role confidence score when the comparison indicates that the trust level is inconsistent with the confidence score.

24. The system of claim 22, wherein modifying the asset confidence score further comprises:

comparing a trust level associated with the one or more user roles with a restriction level associated with the one or more asset types;

increasing the asset confidence score when comparison indicates that the trust level is consistent with the restriction level; and decreasing the asset confidence score when the comparison indicates that the trust level is inconsistent with the confidence score.

25. The system of claim 22, further comprising:

determining one or more interactions between one or more of the plurality of users or the plurality of assets based on the monitored network traffic;

determining the portion of the network traffic associated with the plurality of users based on the one or more interactions; and determining the other portion of the network traffic associated with the plurality of assets based on the one or more interactions.

26. The system of claim 22, further comprising:

determining one or more interactions between one or more administrative users and the plurality of assets based on the monitored network traffic;

determining one or more other interactions between one or more non-administrative users and the plurality of assets based on the monitored network traffic; and determining one or more administrative assets based on the one or more interactions between the one or more administrative users and the plurality of assets, wherein the one or more interactions associated with the one or more administrative assets are associated with the one or more administrative users.

27. The system of claim 22, further comprising, determining an asset type for an asset based on a similarity of one or more characteristics of the asset to one or more characteristics of the one or more other assets, wherein the asset type for the asset is determined based on the asset type of the similar one or more other assets.

28. The system of claim 22, wherein the plurality of assets further comprise one or more of entities, documents, directories, APIs, REST endpoints, micro-services, MSRPC/DCOM interfaces, database tables, media files or streams, or file systems.

* * * * *